US010493981B2

(12) United States Patent
Lavoie et al.

(10) Patent No.: US 10,493,981 B2
(45) Date of Patent: Dec. 3, 2019

(54) INPUT SIGNAL MANAGEMENT FOR VEHICLE PARK-ASSIST

(71) Applicant: Ford Global Technologies, LLC, Dearborn, MI (US)

(72) Inventors: Erick Michael Lavoie, Dearborn, MI (US); Ali Hassani, Ann Arbor, MI (US); Alyssa Chatten, Royal Oak, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/948,479

(22) Filed: Apr. 9, 2018

(65) Prior Publication Data
US 2019/0308614 A1 Oct. 10, 2019

(51) Int. Cl.
B60W 30/06 (2006.01)
B60R 25/01 (2013.01)
(Continued)

(52) U.S. Cl.
CPC .......... B60W 30/06 (2013.01); B60R 25/01 (2013.01); B60R 25/245 (2013.01); B60R 25/34 (2013.01); G05D 1/0016 (2013.01); G05D 1/028 (2013.01); B60R 2325/101 (2013.01); B60R 2325/205 (2013.01); B60W 2550/40 (2013.01); G05D 2201/0213 (2013.01)

(58) Field of Classification Search
CPC ... B60W 30/06; B60W 2550/40; B60R 25/01; B60R 25/245; B60R 25/34; B60R 2325/101; B60R 2325/205; G05D 1/0016; G05D 1/028
See application file for complete search history.

(56) References Cited

U.S. PATENT DOCUMENTS 5,959,724 A 9/1999 Izumi
6,275,754 B1 8/2001 Shimizu
(Continued)

FOREIGN PATENT DOCUMENTS

CN 101929921 A 12/2010
CN 103818204 A 5/2014
(Continued)

OTHER PUBLICATIONS

US 9,772,406 B2, 09/2017, Liu (withdrawn)
(Continued)

Primary Examiner — Behrang Badii
Assistant Examiner — Daniel L Greene
(74) Attorney, Agent, or Firm — Frank Lollo; Eversheds Sutherland (US) LLP

(57) ABSTRACT

Method and apparatus are disclosed for input signal management for vehicle park-assist. An example vehicle includes an autonomy unit, a communication module, and a controller. The controller is to perform, via the autonomy unit, remote parking upon receiving, via the communication module, a remote parking signal from a mobile device. The controller also is to receive an unlock request during the remote parking from a first key fob, determine a number of key fobs within a tethering range, and prevent processing of the unlock request when the number of key fobs is one.

20 Claims, 9 Drawing Sheets

(51) Int. Cl.
      *G05D 1/00*      (2006.01)
      *G05D 1/02*      (2006.01)
      *B60R 25/34*     (2013.01)
      *B60R 25/24*     (2013.01)

(56) References Cited

U.S. PATENT DOCUMENTS

| | | |
|---|---|---|
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson et al. |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter et al. |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter et al. |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel et al. |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2* | 3/2016 | Protopapas ............ G06F 21/31 |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann et al. |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1* | 8/2018 | Jung ................ B62D 15/0285 |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |

(56) References Cited

U.S. PATENT DOCUMENTS

| | | |
|---|---|---|
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1* | 6/2010 | Taylor ............... B60R 25/00 455/404.1 |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1* | 12/2011 | Ghabra ............... B60R 25/24 340/426.36 |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1* | 9/2014 | Protopapas ............ G06F 21/31 726/5 |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1* | 4/2015 | Grimm ............... B60R 25/1001 340/426.18 |
| 2015/0116079 A1* | 4/2015 | Mishra ............... G07C 9/00007 340/5.52 |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart et al. |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1* | 1/2016 | Soroko ............... G07C 9/00007 340/5.61 |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1* | 10/2016 | Hatton ............... G07C 9/00857 |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1* | 12/2016 | Daman ............... H04W 4/70 |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |

(56) References Cited

U.S. PATENT DOCUMENTS

| | | |
|---|---|---|
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1* | 10/2017 | Whitaker .............. B60W 10/04 |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1* | 1/2019 | Bahrainwala ...... G06Q 10/0833 |
| 2019/0042003 A1 | 2/2019 | Parazynski |
| 2019/0066503 A1 | 2/2019 | Li |
| 2019/0103027 A1* | 4/2019 | Wheeler ................. B60Q 1/50 |
| 2019/0137990 A1* | 5/2019 | Golgiri ................. G08G 1/168 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |

(56) References Cited

FOREIGN PATENT DOCUMENTS

| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Al-Sherbaz, Ali et al., Hybridisation of GNSS with other wireless/sensors technologies on board smartphones to offer seamless outdoors-indoors positioning for LBS applications, Apr. 2016, 3 pages.

Jingbin Liu, IParking: An Intelligent Indoor Location-Based Smartphone Parking Service, Oct. 31, 2012, 15 pages.

Bill Howard, Bosch's View of the Future Car: Truly Keyless Entry, Haptic Feedback, Smart Parking, Cybersecurity, Jan. 9, 2017, 8 Pages.

Daimler AG, Remote Parking Pilot, Mar. 2016 (3 Pages).

Search Report dated Jan. 19, 2018 for GB Patent Application No. 1711988.4 (3 pages).

Search Report dated Jul. 11, 2017 for GB Patent Application No. 1700447.4 (3 Pages).

Search Report dated May 21, 2018 for Great Britain Patent Application No. GB 1800277.4 (5 Pages).

Search Report dated Nov. 22, 2018 for GB Patent Application No. GB 1809829.3 (6 pages).

Search Report dated Nov. 27, 2018 for GB Patent Application No. GB 1809112.4 (3 pages).

Search Report dated Nov. 28, 2017, for GB Patent Application No. GB 1710916.6 (4 Pages).

Search Report dated Nov. 28, 2018 for GB Patent Application No. GB 1809842.6 (5 pages).

Search Report dated Oct. 10, 2018 for GB Patent Application No. 1806499.8 (4 pages).

* cited by examiner

INPUT SIGNAL MANAGEMENT FOR VEHICLE PARK-ASSIST

CROSS-REFERENCE TO RELATED APPLICATIONS

This application is related to U.S. application Ser. No. 15/948,428 and U.S. application Ser. No. 15/948,461, which were filed on Apr. 9, 2018 and are incorporated herein by reference in their entireties.

TECHNICAL FIELD

The present disclosure generally relates to vehicle park-assist and, more specifically, to input signal management for vehicle park-assist.

BACKGROUND

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead. Further, some vehicles include park-assist features in which the vehicle autonomously and/or semi-autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for input signal management for vehicle park-assist. An example disclosed vehicle includes an autonomy unit, a communication module, and a controller. The controller is to perform, via the autonomy unit, remote parking upon receiving, via the communication module, a remote parking signal from a mobile device. The controller also is to receive an unlock request during the remote parking from a first key fob, determine a number of key fobs within a tethering range, and prevent processing of the unlock request when the number of key fobs is one.

An example disclosed method includes receiving, via a communication module of a vehicle, a remote parking signal from a mobile device and performing, via an autonomy unit, remote parking upon receipt of the remote parking signal. The example disclosed method also includes receiving an unlock request during the remote parking from a first key fob and determining, via a processor, a number of key fobs within a tethering range. The example disclosed method also includes preventing processing of the unlock request when the number of key fobs is one.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
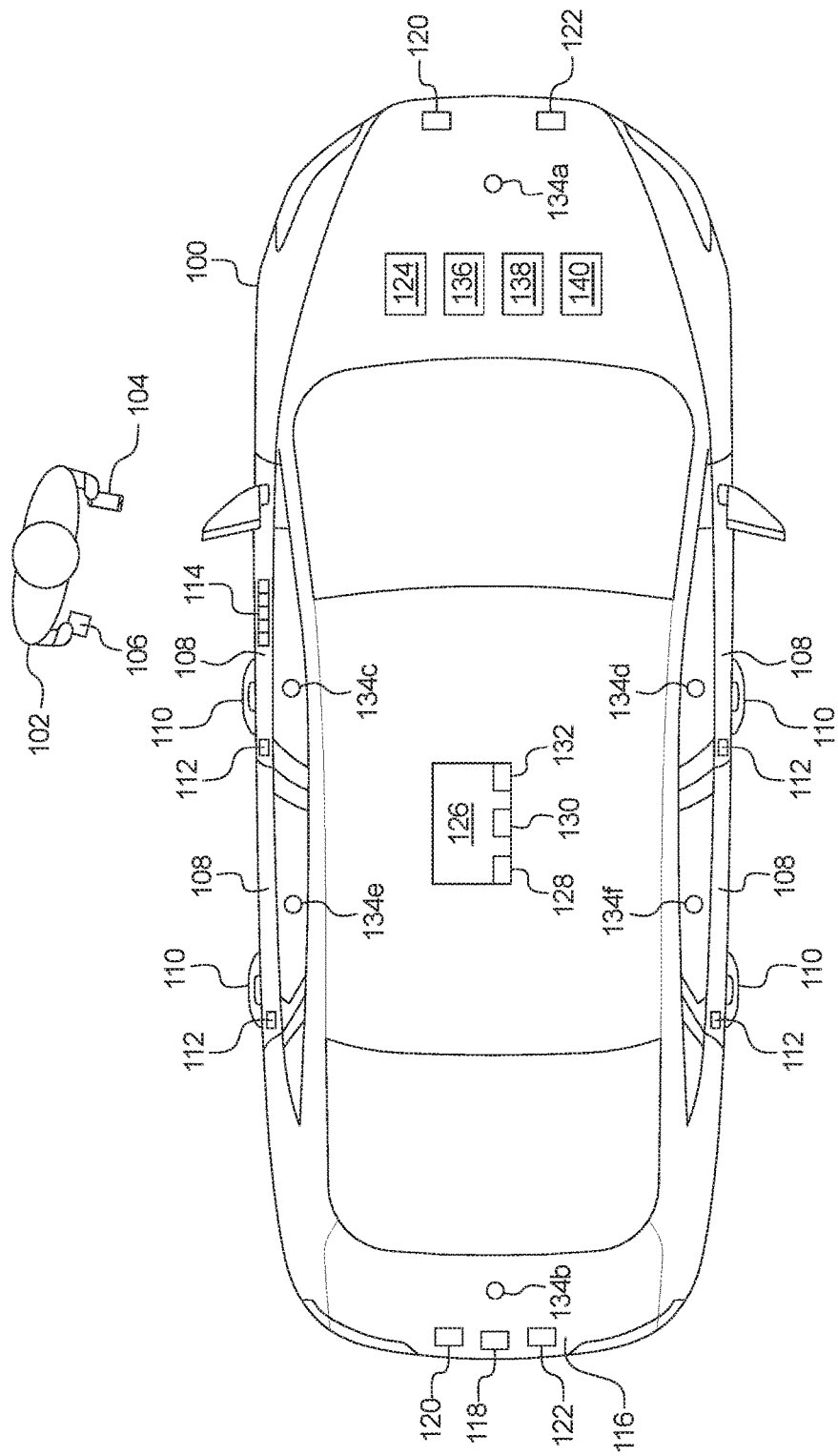
FIG. 1 illustrates an example vehicle configured to communicate with a mobile device and a key fob of a user in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead.

Further, some vehicles include park-assist features (e.g., a remote park-assist feature) in which the vehicle autonomously and/or semi-autonomously controls motive functions of the vehicle to park the vehicle into a parking spot. A remote park-assist feature enables a vehicle to be autonomously and/or semi-autonomously parked when a driver of the vehicle has already exited the vehicle. For instance, in order to use a remote park-assist feature to autonomously park a vehicle into a parking spot, the driver (1) positions the vehicle near a parking spot, (2) exits the vehicle, (3) stands near the vehicle and/or the parking spot, and (4) sends a remote signal (e.g., via a mobile device) to the vehicle to initiate the remote park-assist feature.

In some instances, a vehicle potentially may receive a number of input signals from a plurality of sources in a short period of time. For instance, a vehicle potentially may receive remote park-assist initiation signal(s) from mobile device(s); remote keyless entry request(s) from key fob(s) and/or phone-as-a-key(s); passive engine start request(s) from key fob(s) and/or phone-as-a-key(s); door lock and/or unlock request(s) from key fob(s), phone-as-a-key(s), vehicle keypad(s), door handle sensor(s), gesture sensing system(s) and/or liftgate sensor(s); engine start request(s) from key fob(s), phone-as-a-key(s), and/or vehicle keypad(s); panic signal(s) from key fob(s), phone-as-a-key(s), and/or vehicle keypad(s); etc. In turn, it potentially may be difficult to manage vehicle input sources from multiple sources without interrupting and/or preventing performance of a desired remote park-assist feature.

Example methods and apparatus disclosed herein facilitate a vehicle in performing remote park-assist features upon request without interruption by prioritizing input signals sent by devices of a user to initiate the remote park-assist features with input signals sent by other devices to initiate (other) vehicle features.

Some examples disclosed herein prioritize input requests by designating a first mobile device for initiating remote park-assist features upon (i) determining that remote parking of the vehicle is currently inactive and (ii) receiving an activation request from the first mobile device. In such examples, an autonomy unit of the vehicle is to perform motive functions of the remote park-assist features that are initiated by the first mobile device designated for remote parking. Further, to facilitate prioritization of input signals, a vehicle controller prevents the autonomy unit from processing remote park-assist requests sent from other phones-as-keys while the first mobile device is designated for remote parking. To prevent potential emergency events from occurring while remote parking is being performed, the vehicle controller is configured to instruct the autonomy unit to stop movement of the vehicle in response to receiving an emergency request while the first mobile device is designated for remote parking. For example, an emergency request is received upon detection that an object is in the path of the vehicle. Further, to enable a user to access a cabin of the vehicle, the vehicle controller is configured to instruct the autonomy unit to stop movement of the vehicle while the first mobile device is designated in response to detecting that the user has grasped and/otherwise engaged a door handle of a vehicle door. Additionally, to further facilitate prioritization of the remote park-assist requests, the vehicle controller is configured to prevent processing of all other nonemergency requests (e.g., sent from other mobile devices) while the first mobile device is designated for remote parking.

Some examples disclosed herein prioritize input requests by monitoring a vehicle speed while an autonomy unit of a vehicle is performing motive functions for remote parking. In such examples, an autonomy unit of the vehicle performs motive functions for remote parking in response to a communication module of the vehicle receiving a remote parking signal from a mobile device of a user. A vehicle controller also is configured to receive an unlock request (e.g., from a key fob, a vehicle keypad, etc.) to unlock a vehicle door while the autonomy unit is performing the motive functions of the remote park-assist features. To enable a user to access a cabin of the vehicle, the vehicle controller is configured to instruct the autonomy unit to stop movement of the vehicle in response to (i) receiving an unlock request and (ii) determining that a vehicle speed is less than or equal to a threshold speed. The user is able to unlock and/or open a vehicle door when the vehicle is stopped. Further, to facilitate prioritization of input requests while remote parking is being performed, the vehicle controller prevents unlocking of the vehicle door in response to (i) receiving the unlock request and (ii) determining that the vehicle speed is greater than the threshold speed. In such instances, the vehicle controller does not instruct the autonomy unit to stop the vehicle and the autonomy unit continues to perform the motive functions for remote parking based upon the remote parking signal(s) received from the mobile device of the user.

Some examples disclosed herein prioritize input requests by monitoring a number of key fobs within a tethering range of a vehicle. In such examples, an autonomy unit of the vehicle performs motive functions for remote parking in response to a communication module of the vehicle receiving a remote parking signal from a mobile device of a user. A vehicle controller also is configured to receive an unlock request from a key fob to unlock a vehicle door while the autonomy unit is performing the motive functions of the remote park-assist features. To facilitate prioritization of input requests while remote parking is being performed, the vehicle controller determines the number of key fobs within the tethering range of the vehicle upon receiving the unlock request while the remote parking is being performed. If the number of key fobs is one, the vehicle controller determines that the unlock request was sent from a key fob of the user initiating the remote parking via the mobile device without having to identify a location and/or distance to the key and/or the mobile device. In turn, the vehicle controller determines that the unlock request was sent accidentally and prevents processing of the unlock request to facilitate prioritization of the input requests. Further, in some examples, the vehicle controller processes the unlock request in response to identifying that the number of key fobs within the tethering range is two or more. In other examples, the vehicle controller attempts to determine whether the key fob that sent the unlock request is the user's key fob by comparing a distance between the key fob and the vehicle to a distance between the mobile device and the vehicle. If the key fob distance matches and/or is within a threshold margin of the mobile device distance, the vehicle controller determines that the user's key fob sent the unlock request and subsequently prevents processing of the unlock request. If the key fob distance does not match and/or is not within the threshold margin of the mobile device, the vehicle controller determines that another user's key fob sent the unlock request and subsequently processes the unlock request.

As used herein, "remote parking," "vehicle remote park-assist," "remote park-assist," and "RePA" refer to a system in which a vehicle controls its motive functions without direct steering or velocity input from a driver to autonomously park within a parking spot while the driver is located outside of the vehicle. For example, an autonomy unit of a remote park-assist system controls the motive functions of the vehicle upon receiving a remote initiation signal from a mobile device of a driver.

As used herein, a "key fob" refers to a dedicated electronic mobile device that wirelessly communicates with a vehicle to unlock and/or lock vehicle doors), open and/or close the vehicle door(s), activate an engine of the vehicle, and/or control other function(s) of the vehicle. In some examples, a user of a vehicle utilizes another mobile device that functions as a phone-as-a-key for wireless communication with the vehicle. As used herein, a "phone-as-a-key" and a "PaaK" refer to an electronic mobile device (e.g., a smart phone, a wearable, a smart watch, a tablet, etc.) that includes hardware and/or software to function as a key fob.

As used herein, to "tether" refers to authenticating a mobile device to initiate remote parking for a vehicle. For example, a vehicle is configured to perform remote parking upon receiving instruction(s) to do so from a mobile device that is tethered to the vehicle and is configured to not perform remote parking upon receiving instruction(s) from a mobile device that is untethered from the vehicle. As used herein, a "tethered" device refers to a mobile device that is enabled to send instructions to a vehicle to perform remote parking. For example, a mobile device is tethered to a vehicle responsive to the mobile device being wirelessly communicatively coupled to the vehicle and located within a predetermined tethering range (e.g., 6 meters) of the vehicle. In such examples, a mobile device that sends instructions to a vehicle to perform remote parking is untethered from the vehicle if the mobile device is beyond the tethering range of the vehicle.

As used herein, "passive entry" and "passive-entry" refer to a system of a vehicle that unlock(s) and/or open(s) one or more doors of the vehicle upon detecting that a key fob and/or phone-as-a-key is proximate to a door of the vehicle. Some passive entry systems prime a door for opening in response to detecting that a key fob and/or phone-as-a-key is approaching and/or within a predetermined range of the vehicle. In such examples, the door is unlocked in response to detecting that (1) a user has touched a handle of the door and (2) the key fob and/or phone-as-a-key is proximate to the door when the handle is touched. As used herein, "passive start" and "passive-start" refer to a system of a vehicle that activates ignition of an engine of the vehicle upon detecting that a key fob and/or phone-as-a-key is within a cabin of the vehicle (e.g., such that drive-away is enabled). Some passive start systems prime an engine for ignition in response to detecting that a key fob and/or phone-as-a-key is approaching and/or within a predetermined range of the vehicle. In such examples, the engine is started in response to detecting that (1) a user has engaged an ignition switch of the vehicle and (2) the key fob and/or phone-as-a-key is within the cabin when the ignition switch is engaged. As used herein, "passive entry passive start," "passive-entry passive-start" and "PEPS" refer to a system of vehicle that is configured to perform passive entry and passive start for the vehicle.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input). As illustrated in FIG. 1, a user 102 wirelessly communicates with the vehicle 100 via a mobile device 104 configured to initiate remote park-assist and a key fob 106.

In the illustrated example, the vehicle 100 includes one or more doors 108 that enable the user 102 to enter and/or exit from a cabin of the vehicle 100. Further, each of the doors 108 of the illustrated example includes a door handle 110 (also referred to as a handle) and a handle sensor 112 (also referred to as a door handle sensor). The door handle 110 enables the user 102 to open and/or close the corresponding one of the doors 108. For example, the user 102 grasps and/or otherwise engages the door handle 110 to open and/or close the corresponding one of the doors 108. Further, the handle sensor 112 detects when the door handle 110 of a corresponding one of the doors 108 is engaged (e.g., by the user 102). For example, the handle sensor 112 for each of the doors 108 is a capacitive sensor and/or any other sensor that is configured to detect when the door handle 110 is engaged.

Further, one of the doors 108 of the illustrated example (e.g., the front driver-side door) includes a keypad 114 that is configured to receive a code from the user 102 (e.g., to unlock the doors 108, to start an engine, etc.). The keypad 114 includes buttons that are labeled with characters (e.g., numeric characters, alphabetic characters, alphanumeric characters) to enable the user 102 to identify the buttons. For example, to enable the user 102 to enter a numeric code, one button may be labeled "1-2," another button may be labeled "3-4," another button may be labeled "5-6," another button may be labeled "7-8," and another button may be labeled "9-0." In other examples, the keypad 114 is located on any other of the doors 108 and/or other exterior surface of the vehicle 100. Alternatively, the keypad 114 is a virtual keypad projected onto a surface (e.g., a window) of the vehicle 100. Further, in some examples, the vehicle 100 includes a plurality of keypads that are located at and/or projected onto different positions on the exterior surface of the vehicle 100.

In the illustrated example, the vehicle 100 also includes a liftgate 116 and a liftgate sensor 118. For example, the liftgate 116 is a door or panel that opens upwardly to provide access to a cargo compartment located at a rear of the vehicle 100. The liftgate sensor 118 is configured to detect a request from the user 102 to open the liftgate 116 via a hands-free liftgate system. For example, the liftgate sensor 118 (e.g., a capacitive sensor, a kick sensor, a gesture recognition system utilizing a camera, etc.) is positioned on and/or next to the liftgate 116 to monitor an activation area near the liftgate 116. When the user 102 extends at least a portion of his or her leg (e.g., a foot) into the activation area, the liftgate sensor 118 detects a request to open the liftgate 116 via the hands-free liftgate system. Further, in some examples, one or more of the doors 108 are configured to actuated in a similar manner. For example, when the user 102 extends a portion of his or her leg and/or arm and/or exerts some other motion, a system of the vehicle 100 recognizes such gesture as a command and opens one or more of the doors 108, vehicle windows, and/or other device of the vehicle 100.

Further, the vehicle 100 of the illustrated example includes proximity sensors 120, cameras 122, and a vehicle speed sensor 124. For example, the proximity sensors 120 are configured to collect data that are utilized to detect and locate nearby objects within the surrounding area of the vehicle 100. The proximity sensors 120 include radar sensor(s) that detect and locate objects via radio waves, LIDAR sensor(s) that detect and locate objects via lasers, ultrasonic sensor(s) that detect and locate objects via ultrasound waves, and/or any other sensor(s) that are able to detect and locate nearby objects. The cameras 122 are configured to capture image(s) and/or video of an area surrounding the vehicle 100 that are utilized to detect and locate nearby objects. In the illustrated example, one of the proximity sensors 120 and one of the cameras 122 are front sensing devices that monitor an area in front of the vehicle 100. Additionally, one of the proximity sensors 120 and one of the cameras 122 are rear sensing devices that monitor an area behind the vehicle 100. Further, the vehicle speed sensor 124 detects a speed at which the vehicle 100 is travelling.

The vehicle 100 also includes a communication module 126 that includes wired or wireless network interfaces to enable communication with other devices (e.g., the mobile device 104, the key fob 106) and/or external networks. The external network(s) may be a public network, such as the Internet; a private network, such as an intranet; or combinations thereof, and may utilize a variety of networking protocols now available or later developed including, but not limited to, TCP/IP-based networking protocols. In such examples, the communication module 126 also includes hardware (e.g., processors, memory, storage, antenna, etc.) and software to control the wired or wireless network interfaces. For example, the communication module 126 includes one or more communication controllers for short-range network(s), local wireless area network(s), cellular(s), and/or other wireless network(s). In the illustrated example, the communication module 126 includes hardware and firmware to establish a wireless connection with the mobile device 104 and/or the key fob 106 of the user 102. For example, the communication module 126 includes communication modules that enable wireless communication with the mobile device 104 and/or the key fob 106 when the user 102 is proximate to the vehicle 100.

In the illustrated example, the communication module 126 includes a LF module 128 (also referred to as a low-frequency communication module, a LF communication module, a low-frequency module), a BLE module 130 (also referred to as a Bluetooth® low-energy communication module, a BLE communication module, a Bluetooth® low-energy module), and a cellular module 132 (also referred to as a cellular network module). The LF module 128 is configured for low-frequency communication. For example, the LF module 128 communicates with the key fob 106 and/or other device(s) via low-frequency signals. The BLE module 130 is configured for Bluetooth® and/or BLE protocol communication. For example, the BLE module 130 communicates with the mobile device 104 and/or other device(s) via the BLE communication protocol. That is, the BLE module 130 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Further, the cellular module 132 is configured for cellular communication. For example, the cellular module 132 communicates with the mobile device 104, the key fob 106, remote server(s), and/or other device(s) via cellular communication protocol(s), such as Global System for Mobile Communications (GSM), Universal Mobile Telecommunications System (UMTS), Long Term Evolution (LTE), and Code Division Multiple Access (CDMA). Additionally or alternatively, the communication module 126 is configured to wirelessly communicate via Wi-Fi communication, Near Field Communication (NFC), UWB (Ultra-Wide Band), ultra-high frequency (UHF) communication, super-high frequency (SHF) communication (communication at between 3 GHz and 30 GHz), and/or any other short-range and/or local wireless communication protocol that enables the communication module 126 to communicatively couple to the mobile device 104, the key fob 106, remote server(s), and/or other device(s).

In the illustrated example, the communication module 126 communicatively couples to a mobile device (e.g., the mobile device 104, the key fob 106) to measure and/or receive measurements of a signal strength (e.g., a received signal strength indicator) of signals broadcasted by the mobile device. For example, the communication module 126 communicatively couples to a mobile device (e.g., the mobile device 104, the key fob 106) to track a distance between the mobile device and the vehicle 100. That is, the communication module 126 receives and analyzes the signal strength measurements between the mobile device and the communication module 126 to determine a distance between that mobile device and the vehicle 100.

The vehicle 100 of the illustrated example also includes antenna nodes 134 that each include hardware (e.g., processors, memory, storage, antenna, etc.) and software to control wireless network interface(s). The antenna nodes 134 include a communication controller for a personal or local area wireless network (e.g., Bluetooth®, Bluetooth® Low Energy (BLE), Zigbee®, Z-Wave®, Wi-Fi®, etc.). In some examples, when the antenna nodes 134 are configured to implement BLE, the antenna nodes 134 may be referred to as "BLE Antenna Modules" or "BLEAMs." The antenna nodes 134 communicatively couple to the mobile device 104 and/or other device(s) to measure and/or receive measurements of a signal strength (e.g., a received signal strength indicator) of signals broadcasted by the mobile device 104. In the illustrated example, the antenna nodes 134 include external nodes that facilitate determining when the mobile device 104, the key fob 106, and/or other remote device(s) are outside of the vehicle 100. For example, the antenna nodes 134 include an antenna node 134a, an antenna node 134b, an antenna node 134c, an antenna node 134d, an antenna node 134e, and an antenna node 134f. Further, in some examples, the antenna nodes 134 include one or more internal nodes that are located within a cabin of the vehicle 100 to facilitate determining when the mobile device 104, the key fob 106, and/or other remote device(s) are within the cabin of the vehicle 100.

The communication module 126 is communicatively coupled to the antenna nodes 134 to track a location of the mobile device 104, the key fob 106, and/or other remote device(s) relative to the vehicle 100. In some examples, when the antenna nodes 134 are configured to implement BLE, the BLE module 130 of the communication module 126 may be referred to as a "BLEM." The communication module 126 receives and analyzes the signal strength measurements between the communication module 126 and a mobile device (e.g., the mobile device 104, the key fob 106). Based on these measurements, the communication module 126 determines a location of that mobile device relative to the vehicle 100.

The vehicle 100 of the illustrated example also includes a body control module 136 that controls various subsystems of the vehicle 100. For example, the body control module 136 is configured to control an immobilizer system, and/or power mirrors, etc. The body control module 136 is electrically coupled to circuits that, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 136 controls door control units that control the electronic locks and electronic windows of the vehicle 100. Additionally, the body control module 136 controls the exterior lights of the vehicle 100. For example, when an authorized mobile device (e.g., the mobile device 104, the key fob 106) is within a predetermined zone of the vehicle 100, the body control module 136 controls various subsystems of the vehicle 100 to activate in anticipation of the user 102 reaching the vehicle 100. For example, the body control module 136 may activate the exterior lights, change the position of a driver's seat, primes one or more of the doors 108 and/or the liftgate 116 to unlock upon the handle sensor 112 and/or the liftgate sensor 118, respectively, detecting the presence of the user 102.

Further, the vehicle 100 of the illustrated example includes an autonomy unit 138 and a RePA controller 140.

For example, the autonomy unit 138 controls performance of autonomous and/or semi-autonomous driving maneuvers of the vehicle 100 based upon, at least in part, image(s) and/or video captured by one or more of the cameras 122 and/or data collected by one or more of the proximity sensors 120. The RePA controller 140 is configured to manage input signal(s) received from the mobile device 104, the key fob 106, other mobile device(s), the keypad 114, the handle sensors 112, the liftgate sensor 118, the proximity sensors 120, the cameras 122, and/or other data source(s) for the vehicle 100 prior to and/or while the autonomy unit 138 is performing autonomous and/or semi-autonomous driving maneuvers for remote park-assist.

Figure 2:
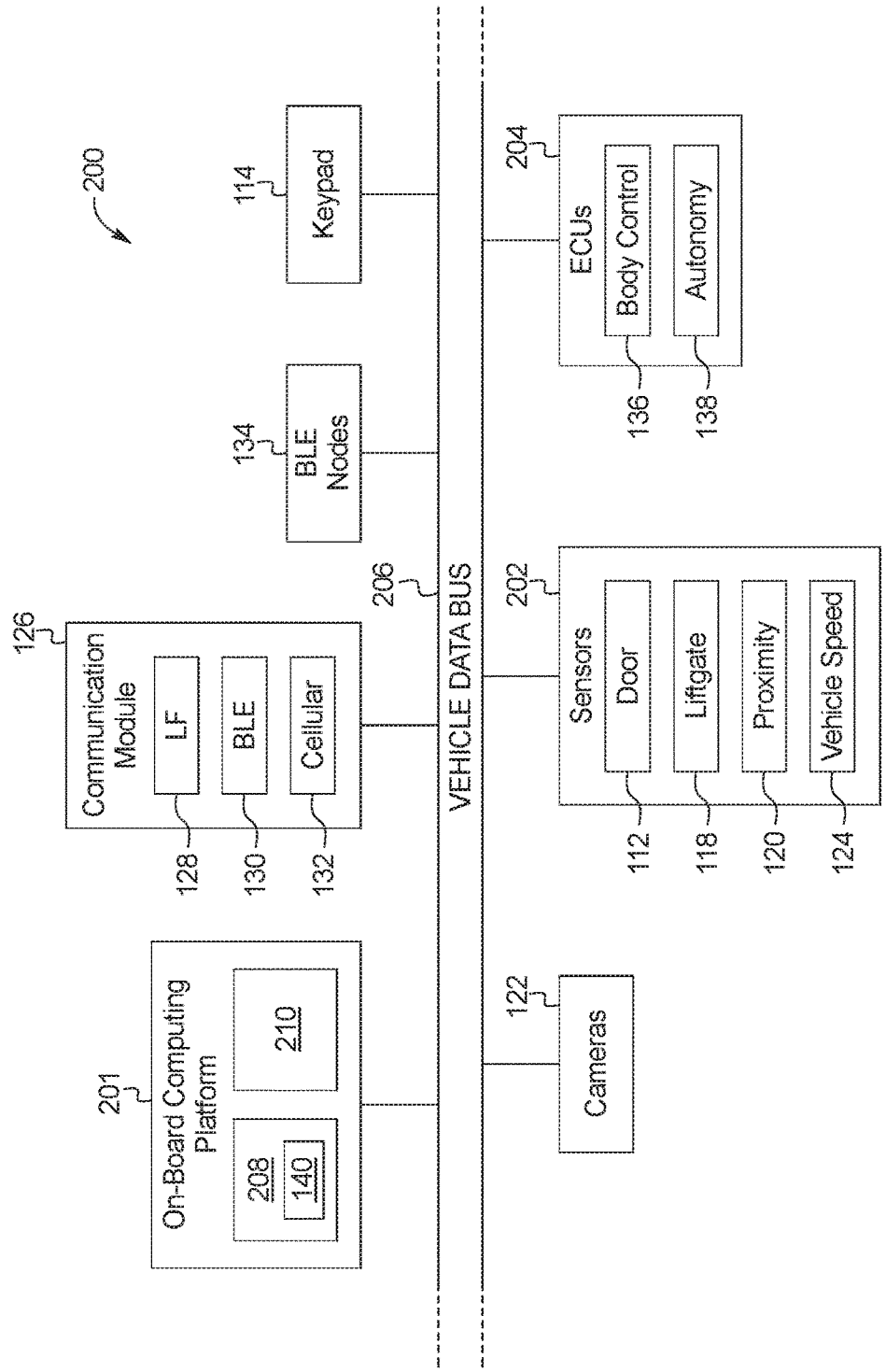
FIG. 2 is a block diagram of electronic components of the vehicle of FIG. 1.

FIG. 2 is a block diagram of electronic components 200 of the vehicle 100. In the illustrated example, the electronic components 200 include an on-board computing platform 201, the communication module 126, the antenna nodes 134, the keypad 114, the cameras 122, sensors 202, electronic control units 204 (ECUs), and a vehicle data bus 206.

The on-board computing platform 201 includes a microcontroller unit, controller or processor 208 and memory 210. In some examples, the processor 208 of the on-board computing platform 201 is structured to include the RePA controller 140. Alternatively, in some examples, the RePA controller 140 is incorporated into another ECU (e.g., the body control module 136) and/or other device (e.g., the communication module 126) with its own processor and memory. The processor 208 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 210 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 210 includes multiple kinds of memory, particularly volatile memory and non-volatile memory.

The memory 210 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 210, the computer readable medium, and/or within the processor 208 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

As illustrated in FIG. 2, the communication module 126 of the electronic components 200 includes the LF module 128, the BLE module 130, and the cellular module 132. Further, the electronic components 200 include the antenna nodes 134, the keypad 114, and the cameras 122.

The electronic components 200 of the illustrated example also include the sensors 202 that are arranged in and around the vehicle 100 to monitor properties of the vehicle 100 and/or an environment in which the vehicle 100 is located. One or more of the sensors 202 may be mounted to measure properties around an exterior of the vehicle 100. Additionally or alternatively, one or more of the sensors 202 may be mounted inside a cabin of the vehicle 100 or in a body of the vehicle 100 (e.g., an engine compartment, wheel wells, etc.) to measure properties in an interior of the vehicle 100. For example, the sensors 202 include accelerometers, odometers, tachometers, pitch and yaw sensors, wheel speed sensors, microphones, tire pressure sensors, biometric sensors and/or sensors of any other suitable type. In the illustrated example, the sensors 202 include the handle sensors 112, the liftgate sensor 118, the proximity sensors 120, and the vehicle speed sensor 124.

The ECUs 204 monitor and control the subsystems of the vehicle 100. For example, the ECUs 204 are discrete sets of electronics that include their own circuit(s) (e.g., integrated circuits, microprocessors, memory, storage, etc.) and firmware, sensors, actuators, and/or mounting hardware. The ECUs 204 communicate and exchange information via a vehicle data bus (e.g., the vehicle data bus 206). Additionally, the ECUs 204 may communicate properties (e.g., status of the ECUs 204, sensor readings, control state, error and diagnostic codes, etc.) to and/or receive requests from each other. For example, the vehicle 100 may have dozens of the ECUs 204 that are positioned in various locations around the vehicle 100 and are communicatively coupled by the vehicle data bus 206. In the illustrated example, the ECUs 204 include the body control module 136 and the autonomy unit 138.

The vehicle data bus 206 communicatively couples the keypad 114, the cameras 122, the antenna nodes 134, the communication module 126, the on-board computing platform 201, the sensors 202, and the ECUs 204. In some examples, the vehicle data bus 206 includes one or more data buses. The vehicle data bus 206 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
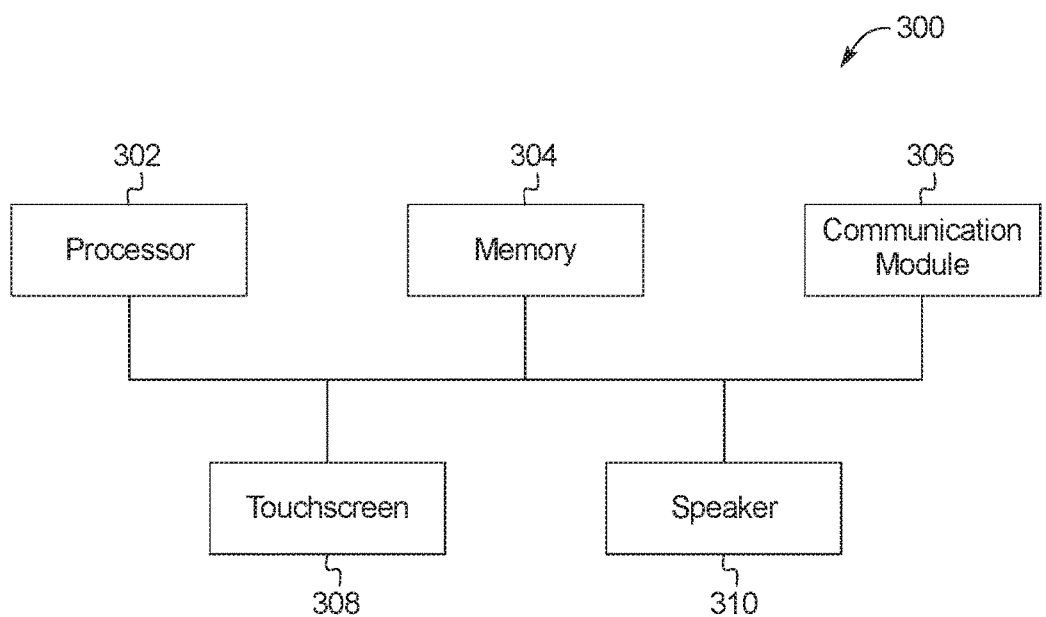
FIG. 3 is a block diagram of electronic components of the mobile device of FIG. 1.

FIG. 3 is a block diagram of electronic components 300 of the mobile device 104. In the illustrated example, the electronic components 300 include a processor 302, memory 304, a communication module 306, a touchscreen 308, and a speaker 310.

The processor 302 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 304 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 304 includes multiple kinds of memory, particularly volatile memory and non-volatile memory.

The memory 304 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 304, the computer readable medium, and/or within the processor 302 during execution of the instructions.

The communication module 306 of the illustrated example includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 306 also includes hardware (e.g., processors, memory, storage, antenna, etc.) and software to control the wired or wireless network interfaces. For example, the communication module 306 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the communication module 306 includes a wireless personal area network (WPAN) module that is configured to wirelessly communicate with the communication module 126 of the vehicle 100 via short-range wireless communication protocol(s). In some examples, the communication module 306 implements the Bluetooth® and/or Bluetooth® Low Energy (BLE) protocols. Additionally or alternatively, the communication module 306 is configured to wirelessly communicate via Wi-Fi®, Near Field Communication (NFC), ultra-wide band (UWB) communication, super-high frequency (SHF) communication, ultra-high frequency (UHF) communication, low-frequency (LF) communication, and/or any other communication protocol that enables the communication module 306 to communicatively couple to the communication module 126 of the vehicle 100.

The touchscreen 308 of the illustrated example provides an interface between the user 102 and the mobile device 104 to enable the user 102 to initiate remote park-assist and/or other function(s) for the vehicle 100. For example, the touchscreen 308 is a resistive touchscreen, a capacitive touchscreen, and/or any other type of touchscreen that displays output information to and tactilely receives input information from the user 102 of the mobile device 104. In some examples, the electronic components 300 of the mobile device 104 also includes other input devices (e.g., buttons, knobs, microphones, etc.) and/or output devices, such as a speaker 310, LEDs, etc., to receive input information from and/or provide output information to the user 102 of the mobile device 104. The user 102 interacts with the touchscreen 308 to initiate remote park-assist and/or other vehicle function(s) via the mobile device 104. Based on input received from the user 102 via the touchscreen 308, the communication module 306 of the mobile device 104 wirelessly communicates with the communication module 126 of the vehicle 100 to initiate motive functions for remote park-assist and/or other function(s) of the vehicle 100.

Figure 4:
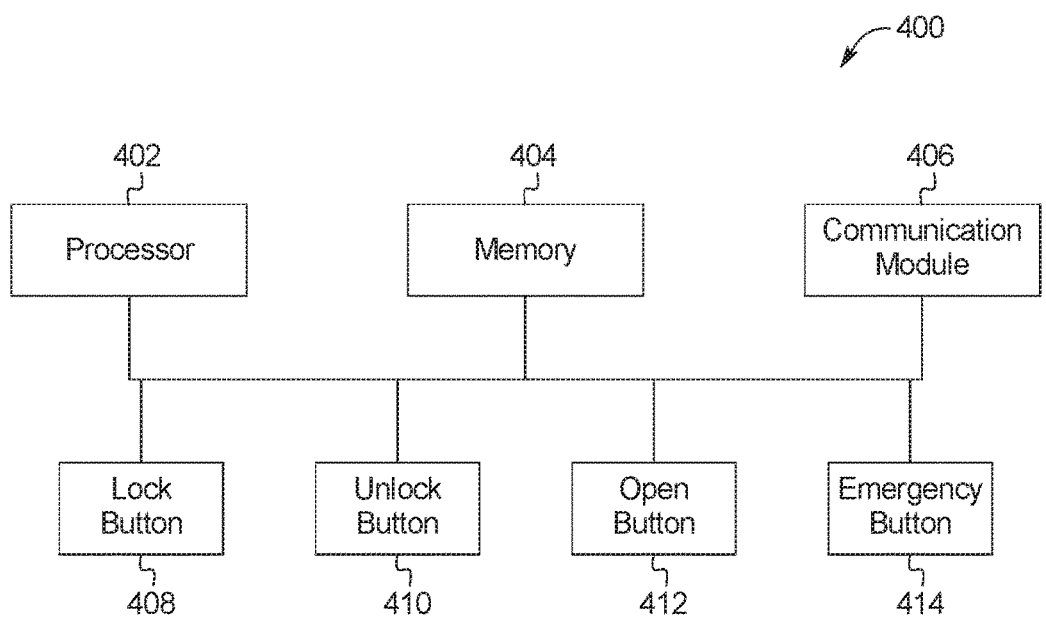
FIG. 4 is a block diagram of electronic components of the key fob of FIG. 1.

FIG. 4 is a block diagram of electronic components 400 of the key fob 106. In the illustrated example, the electronic components 400 include a processor 402, memory 404, a communication module 406, a lock button 408, an unlock button 410, an open button 412, and an emergency button 414.

The processor 402 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 404 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 404 includes multiple kinds of memory, particularly volatile memory and non-volatile memory.

The memory 404 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 404, the computer readable medium, and/or within the processor 402 during execution of the instructions.

The communication module 406 of the illustrated example includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 406 also includes hardware (e.g., processors, memory, storage, antenna, etc.) and software to control the wired or wireless network interfaces. For example, the communication module 406 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the communication module 406 includes a wireless personal area network (WPAN) module that is configured to wirelessly communicate with the communication module 126 of the vehicle 100 via short-range wireless communication protocol(s). In some examples, the communication module 406 implements the Bluetooth® and/or Bluetooth® Low Energy (BLE) protocols. Additionally or alternatively, the communication module 406 is configured to wirelessly communicate via Wi-Fi®, Near Field Communication (NFC), ultra-wide band (UWB) communication, super-high frequency (SHF) communication, ultra-high frequency (UHF) communication, low-frequency (LF) communication, and/or any other communication protocol that enables the communication module 406 to communicatively couple to the communication module 126 of the vehicle 100.

Further, the lock button 408, the unlock button 410, the open button 412, and the emergency button 414 of the electronic components 400 provide an interface between the user 102 and the key fob 106 to enable the user 102 to function(s) for the vehicle 100. Based on the input received from the user 102 via the lock button 408, the unlock button 410, the open button 412, and/or the emergency button 414, the communication module 406 of the key fob 106 wirelessly communicates with the communication module 126 of the vehicle 100 to initiate function(s) of the vehicle 100. For example, upon the user 102 pressing the lock button 408, the communication module 406 is configured to send a signal to the communication module 126 of the vehicle 100 to instruct the body control module 136 to lock one or more of the doors 108. Upon the user 102 pressing the unlock button 410, the communication module 406 is configured to send a signal to the communication module 126 of the vehicle 100 to instruct the body control module 136 to unlock one or more of the doors 108. Upon the user 102 pressing the open button 412, the communication module 406 is configured to send a signal to the communication module 126 of the vehicle 100 to instruct the body control module 136 to open one or more of the doors 108. Further, upon the user 102 pressing the emergency button 414, the communication module 406 is configured to send a signal to the communication module 126 of the vehicle 100 to instruct the body control module 136 to emit an emergency alarm (e.g., via a horn, exterior lamps, etc.). Additionally or alternatively, the electronic components 400 of the key fob 106 include other input devices (e.g., other buttons) and/or output devices to receive input information from and/or provide output information to the user 102.

Figure 5:
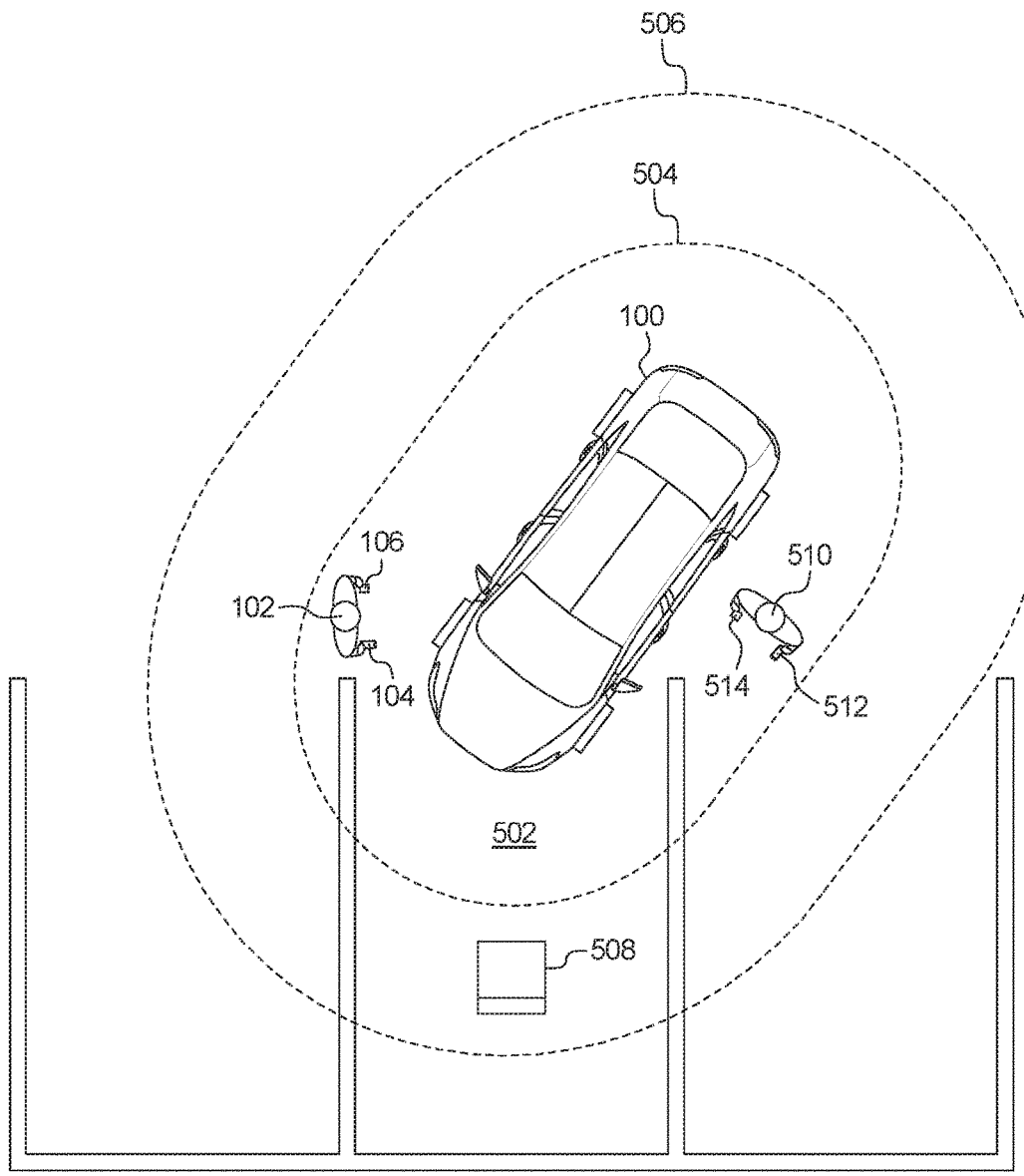
FIG. 5 depicts an example system for managing input signals for remote park-assist of the vehicle of FIG. 1.

FIG. 5 depicts an example system for managing input signals for remote park-assist of the vehicle 100. In the illustrated example, the user 102 utilizes the mobile device 104 to initiate the performance of remote-park assist motive functions by the autonomy unit 138 to autonomously park the vehicle 100 within a parking spot 502.

The vehicle 100 of the illustrated example is permitted to autonomously perform motive functions for remote park-assist when the user 102 is within a tethering range 504 of the vehicle 100 and is prohibited from autonomously performing the motive functions when the user 102 is outside of the tethering range 504. For instance, some governmental have instituted regulations that require the user 102 be within the tethering range 504 of the vehicle 100 while the vehicle 100 is autonomously performing remote park-assist motive functions. The tethering range 504 of the illustrated example is defined to extend to a predetermined distance (e.g., 6 meters) from an exterior surface of the vehicle 100. The user 102 is within the tethering range 504 of the vehicle 100 if a distance between the user 102 and the exterior surface of the vehicle 100 is less than or equal to the predetermined distance of the tethering range 504.

In the illustrated example, the RePA controller 140 determines the distance between the user 102 and the exterior surface of the vehicle 100 by determining a distance between the key fob 106 of the user 102 and the communication module 126 of the vehicle 100. For example, the key fob 106 communicates with the communication module 126 of the vehicle via low-frequency communication. Further, the mobile device 104 communicates with the communication module 126 of the vehicle 100 via the BLE communication protocol, the Wi-Fi communication protocol, and/or super-high frequency communication. In the illustrated example, the RePA controller 140 determines the distance between the user 102 and the vehicle 100 based upon the low-frequency communication of the key fob 106 rather than the wireless communication of the mobile device 104, because calculating a distance based upon RSSI of low-frequency communication is more accurate than calculating a distance based upon RSSI of BLE, Wi-Fi, and/or super-high frequency communication. That is, because the key fob 106 has a LF communication module for low-frequency communication with the communication module 126 of the vehicle 100, the RePA controller 140 utilizes the RSSI of communication between the key fob 106 and the communication module 126 to approximate a distance between the user 102 and the vehicle 100.

The vehicle 100 of the illustrated example also corresponds with a threshold range 506 that is greater than and/or extends beyond the tethering range 504. The RePA controller 140 utilizes the threshold range 506 to limit a distance from which some other vehicle functions may be remotely initiated by a remote device associated with the vehicle 100. For example, the RePA controller 140 permits other vehicle functions (e.g., passive entry, passive engine start, remote unlocking, remote opening, remote engine start, etc.) to be initiated by a mobile device that is located within the threshold range 506 and prohibits those other vehicle functions from being initiated by a mobile device that is located beyond the threshold range 506. In some examples, the threshold distance is defined based upon, at least in part, the limitations of the communication protocol(s) utilized for wireless communication between mobile device(s) and the communication module 126 of the vehicle 100. Further, in some examples, the RePA controller 140 permits some vehicle functions (e.g., emergency functions) to be remotely initiated by a remote device (e.g., by sending an emergency signal) that is located beyond the threshold range 506.

In operation, the RePA controller 140 determines whether remote park-assist is active for the vehicle 100. That is, the RePA controller 140 identifies whether the autonomy unit 138 is performing motive functions for remote park-assist that were initiated from the mobile device 104 of the user 102 and/or another mobile device 104 of another user associated with the vehicle 100. If the RePA controller 140 determines that the remote park-assist is inactive, the RePA controller 140 waits to designate a mobile device for initiating remote park-assist. For example, when the remote park-assist of the vehicle 100 is inactive, the RePA controller 140 designates a mobile device upon receiving, via the communication module 126, an activation request from the mobile device. That is, the RePA controller 140 is configured to designate the mobile device 104 of the user in response to RePA controller 140 (i) determining that the remote park-assist is inactive and (ii) receiving an activation request from the mobile device 104. In some examples, the mobile device 104 sends the activation request upon the user opening a remote parking app via the touchscreen 308 of the mobile device 104.

When the RePA controller 140 designates a mobile device, the RePA controller 140 (i) enables that mobile device to initiate remote park-assist motive functions and (ii) prevents other mobile device(s) from initiating remote park-assist motive functions while another mobile device is designated. By preventing the autonomy unit 138 from processing remote park-assist requests sent from other mobile device(s) while the phone-as-a-104 key is designated for remote park-assist, the RePA controller 140 facilitates prioritization and processing of input requests while remote park-assist is being performed.

In the illustrated example, the autonomy unit 138 of the vehicle 100 activates the remote park-assist in response to the RePA controller 140 designating the mobile device 104 for the remote park-assist. That is, upon designating the mobile device 104, the RePA controller 140 instructs the autonomy unit 138 to activate one or more remote park-assist features. Further, the RePA controller 140 processes remote parking signals received by the communication module 126 from the mobile device 104 when the mobile device 104 is designated for remote park-assist of the vehicle 100.

The autonomy unit 138 is configured to perform motive functions for remote park-assist based upon the remote parking signals that are sent from the mobile device 104, received by the communication module 126, and processed by the RePA controller 140. For example, the autonomy unit 138 performs motive functions for remote park-assist based upon remote parking signals sent by the mobile device 104 of the user 102 if the RePA controller 140 determines that the key fob 106 of the user 102 is within the tethering range 504 of the vehicle 100 at the time the remote parking signals are sent from the mobile device 104. That is, the autonomy unit 138 performs motive functions for remote park-assist when the user 102 is within the tethering range 504 and does not perform motive functions for remote park-assist when the user 102 is beyond the tethering range 504. To determine whether the user 102 is within the tethering range 504 of the vehicle 100, the RePA controller 140 determines a distance between the user 102 and the vehicle 100 and subsequently compares that distance to a distance of the tethering range 504. For example, to determine the distance between the user 102 and the vehicle 100, the RePA controller 140 determines the distance between the key fob 106 of the user 102 and the communication module 126 of the vehicle 100 based upon signal strengths (RSSIs) of the wireless communication (e.g., BLE protocol communication) between the key fob 106 and the communication module 126. Further, in some examples, the RePA controller 140 determines that both the key fob 106 and the mobile device 104 correspond to the user 102 upon identifying that the distance to and/or location of the key fob 106 with respect to the vehicle 100 (e.g., determined based upon RSSIs of communication between the key fob 106 and the communication module 126) corresponds with the distance to and/or location of the mobile device 104 with respect to the vehicle 100 (e.g., determined based upon RSSIs of communication between the mobile device 104 and the communication module 126).

In the illustrated example, to prevent potential emergency events from occurring while remote parking is being performed, the RePA controller 140 also is configured to instruct the autonomy unit 138 to stop movement of the vehicle 100 and performance of remote park-assist in response to receiving an emergency signal while the mobile device 104 is sending remote parking signals to the vehicle 100. That is, the autonomy unit 138 is configured to stop motive functions of the vehicle 100 for remote park-assist upon receipt of an emergency signal. For example, an emergency signal is transmitted for an emergency event upon detecting that an obstacle (e.g., a person, an animal, an inanimate object) is positioned along a vehicle path for the motive functions of the vehicle 100. In the illustrated example, an emergency signal is transmitted upon the RePA controller 140 detecting, via one or more of the proximity sensors 120 and/or the cameras 122, that an object 508 (e.g., a trash can) is within the parking spot 502 into which the vehicle 100 is being parked. Additionally or alternatively, the communication module 126 of the vehicle 100 receives an emergency signal from a nearby mobile device (e.g., a phone-as-a-key, a key fob). For example, the user 102 is able to send an emergency signal via the key fob 106 upon seeing that the object 508 is within the path of the vehicle 100. Another user 510 that is within the threshold range 506 of the vehicle 100 also is able to send an emergency signal via a mobile device 512 and/or a key fob 514 upon seeing that the object 508 is within the path of the vehicle 100. In the illustrated example, the mobile device 512 includes phone-as-a-key and/or remote park-assist functionality. In some examples, the emergency signal sent from a key fob (e.g., the key fob 106, the key fob 514) includes a panic request signal that is sent by a user (e.g., the user 102, the user 510) pressing an emergency button (e.g., the emergency button 414) of the key fob. In some examples, the emergency signal sent from a key fob (e.g., the key fob 106, the key fob 514) includes a series of requests (e.g., two remote unlock requests) that are sent by a user (e.g., the user 102, the user 510) by pressing a predefined sequence of button(s) of the key fob (e.g., sending two remote unlock request signals in succession) within a predefined period of time (e.g., two seconds). In some examples, the predefined sequence of button(s) of a key fob may be configurable to user preferences. In some examples, the emergency signal sent from a key fob (e.g., the key fob 106, the key fob 514) includes a sequence in which a button (e.g., an unlock button, a lock button) is continuously pressed by a user (e.g., the user 102, the user 510) for a predefined period of time. Further, in some examples, the emergency signal sent from a key fob (e.g., the key fob 106, the key fob 514) includes a sequence in which two or more buttons (e.g., an unlock button and an emergency button) are pressed simultaneously by a user (e.g., the user 102, the user 510).

To enable a user (e.g., the user 102, the user 510) to access a cabin of the vehicle 100, the RePA controller 140 of the illustrated example also is configured to instruct the autonomy unit 138 to stop movement of the vehicle 100 and performance of remote park-assist in response to receiving an unlock trigger signal to unlock one or more of the doors 108 of the vehicle 100. For example, an unlock trigger signal is received in response to (1) one of the handle sensors 112 detecting that a user has grasped and/or otherwise engaged the door handle 110 of the corresponding one of the doors 108 and (2) the RePA controller 140 detecting that a key fob and/or mobile device is near the corresponding one of the doors 108. That is, the RePA controller 140 is configured to unlock one or more of the doors 108 in response to (1) one of the handle sensors 112 detecting that a user (e.g., the user 102, the user 510) has grasped and/or otherwise engaged the door handle 110 of the corresponding one of the doors 108 and (2) the RePA controller 140 detecting that a key fob and/or mobile device is near the corresponding one of the doors 108 when the vehicle 100 is stationary.

In the illustrated example, the RePA controller 140 further facilitates prioritization and processing of input requests while remote park-assist is being performed by preventing processing of other nonemergency requests for the vehicle 100 (e.g., passive-entry passive-start signals, remote keyless entry signals, remote door unlock requests, etc.) while remote park-assist is active. For example, the RePA controller 140 is configured to receive a nonemergency request via a mobile device including phone-as-a-key functionality (e.g., the mobile device 104, the mobile device 512), a key fob (e.g., the key fob 106, the key fob 514), the keypad 114, the liftgate sensor 118, a cellular network, etc. In some examples, when the mobile device 104 of the user 102 is designated for remote park-assist for the vehicle 100, a nonemergency request includes an activation request from the mobile device 512 of the user 510. In such examples, the RePA controller 140 does not process the request to designate the mobile device 512. Rather, the RePA controller 140 is configured to send, via the communication module 126, an alert to the mobile device 512 indicating that (i) the mobile device 104 of the user 102 is currently designated for remote park-assist of the vehicle 100 and/or (ii) a duration of time during which the mobile device 104 will remain designated for the remote park-assist. Additionally or alternatively, when the vehicle 100 is stationary, the RePA controller 140 is configured to send, via the communication module 126, a request to the mobile device 104 of the user 102 for permission to change designation for the remote park-assist of the vehicle 100 to the mobile device 512 of the user 510.

Figure 6:
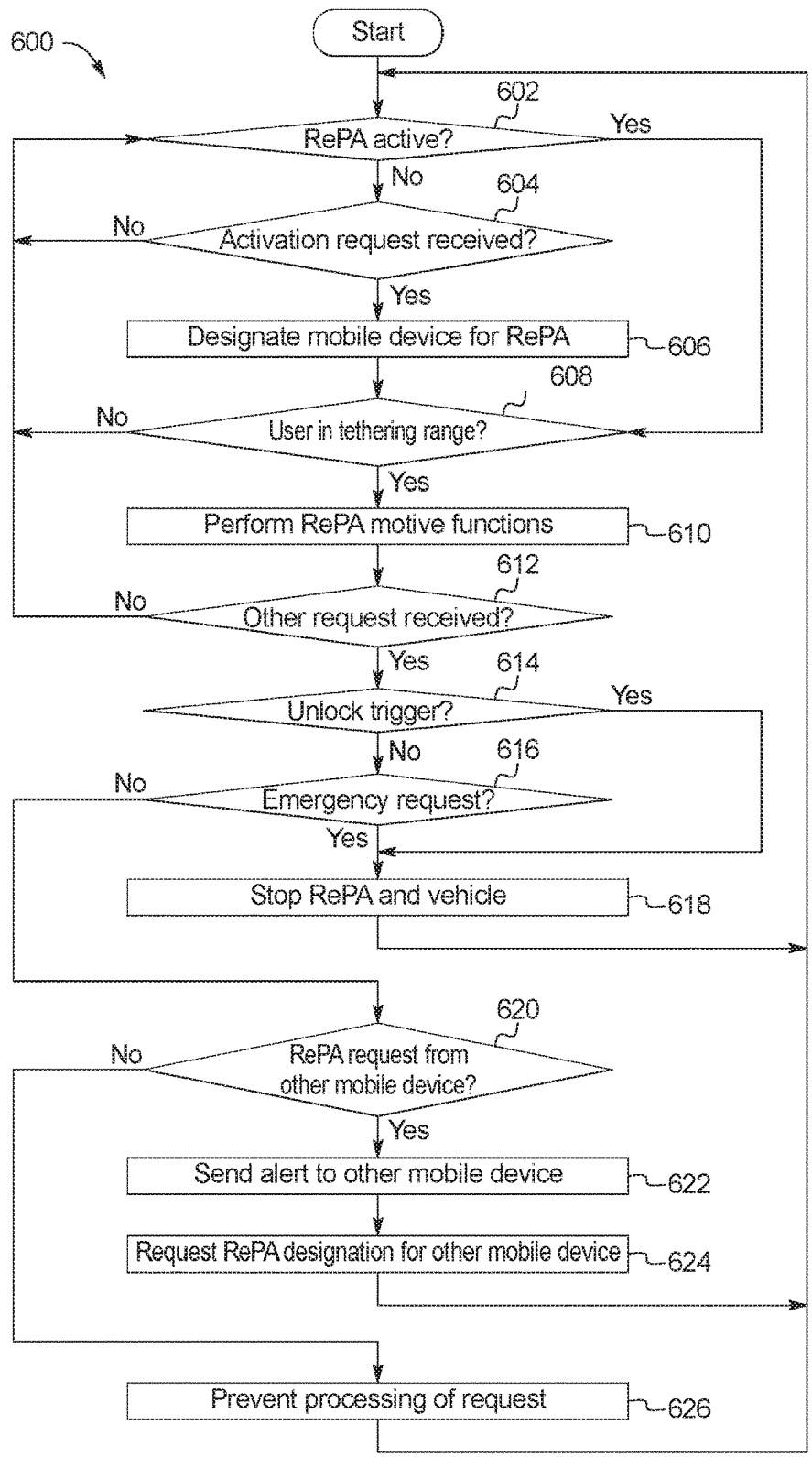
FIG. 6 is a flowchart for managing input signals for remote park-assist in accordance with the teachings herein.

FIG. 6 is a flowchart of an example method 600 to manage input signals for remote park-assist. The flowchart of FIG. 6 is representative of machine readable instructions that are stored in memory (such as the memory 210 of FIG. 2) and include one or more programs which, when executed by a processor (such as the processor 208 of FIG. 2), cause the vehicle 100 to implement the example RePA controller 140 of FIGS. 1 and 2. While the example program is described with reference to the flowchart illustrated in FIG. 6, many other methods of implementing the example RePA controller 140 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the RePA controller 140 determines whether remote park-assist for the vehicle 100 is active. In response to the RePA controller 140 determining that remote park-assist is activated, the method 600 proceeds to block 608. Otherwise, in response to the RePA controller 140 determining that remote park-assist is not activated, the method 600 proceeds to block 604. At block 604, the RePA controller 140 determines whether the communication module 126 of the vehicle 100 has received an activation request from a mobile device (e.g., the mobile device 104 of the user 102) to activate remote park-assist for the vehicle 100. In response to the RePA controller 140 determining that an activation request has not been received, the method 600 returns to block 602. Otherwise, in response to the RePA controller 140 determining that an activation request has been received, the method 600 proceeds to block 606.

At block 606, the RePA controller 140 designates the mobile device 104 that sent the activation request for initiation of remote park-assist features. At block 608, the RePA controller 140 determines whether the user 102 of the mobile device 104 is within the tethering range 504 of the vehicle 100 for initiating remote park-assist features. For example, the RePA controller 140 determines whether the user 102 is within the tethering range 504 based upon signal strengths of communication between the communication module 126 of the vehicle 100 and the key fob 106 of the user 102. In response to the RePA controller 140 determining that the user 102 is outside of the tethering range 504, the method 600 returns to block 602. Otherwise, in response to the RePA controller 140 determining that the user 102 is within the tethering range 504, the autonomy unit 138 activates remote park-assist and the method 600 proceeds to block 610.

At block 610, the autonomy unit 138 performs remote park-assist motive functions that are initiated by the mobile device 104 of the user 102. At block 612, the RePA controller 140 determines whether the vehicle 100 has received another input request (e.g., via the communication module 126, the handle sensors 112, the keypad 114, the liftgate sensor 118, etc.). In response to the RePA controller 140 determining that another input request has not been received, the method 600 returns to block 602. Otherwise, in response to the RePA controller 140 determining that another input request has been received, the method 600 proceeds to block 614.

At block 614, the RePA controller 140 determines whether the other input request is an unlock trigger signal to unlock one or more of the doors 108 of the vehicle 100. For example, an unlock trigger signal is received upon (1) one of the handle sensors 112 detecting that a user has grasped and/or otherwise engaged the door handle 110 of the corresponding one of the doors 108 and (2) the RePA controller 140 detecting that a key fob and/or mobile device is near the corresponding one of the doors 108. In response to the RePA controller 140 determining that the other input request is an unlock trigger signal, the method 600 proceeds to block 618. Otherwise, in response to the RePA controller 140 determining that the other input request is not an unlock trigger signal, the method 600 proceeds to block 616.

At block 616, the RePA controller 140 determines whether the other input request is an emergency request. For example, an emergency request may be received from the key fob 106 of the user 102, the key fob 514 and/or the mobile device 512 of the user 510, etc. and/or based upon information collected by one or more of the proximity sensors 120, one or more of the cameras 122, etc. In response to the RePA controller 140 determining that the other input request is an emergency request, the method 600 proceeds to block 618. At block 618, the RePA controller 140 causes the autonomy unit 138 to stop movement of the vehicle 100 and performance of remote park-assist. Otherwise, in response to the RePA controller 140 determining that the other input request is not an emergency request, the method 600 proceeds to block 620.

At block 620, the RePA controller 140 determines whether the other input request is a RePA activation request from another mobile device (e.g., the mobile device 512 of the user 510). In response to the RePA controller 140 determining that the other input request is an activation request from the mobile device 512, the method 600 proceeds to block 622. At block 622, the RePA controller 140 sends an alert, via the communication module 126, to the mobile device 512 indicating that the mobile device 104 of the user 102 is currently designated for remote park-assist. In the illustrated example, the method 600 also proceeds to block 624 at which the RePA controller 140 sends, a request to the mobile device 104 on behalf of the user 510 for permission to change designation for remote park-assist to the mobile device 512 of the user 510. Returning to block 620, in response to the RePA controller 140 determining that the other input request is not a RePA activation request from another mobile device, the method 600 proceeds to block 626 at which the RePA controller 140 prevents processing of the other input request.

Figure 7:
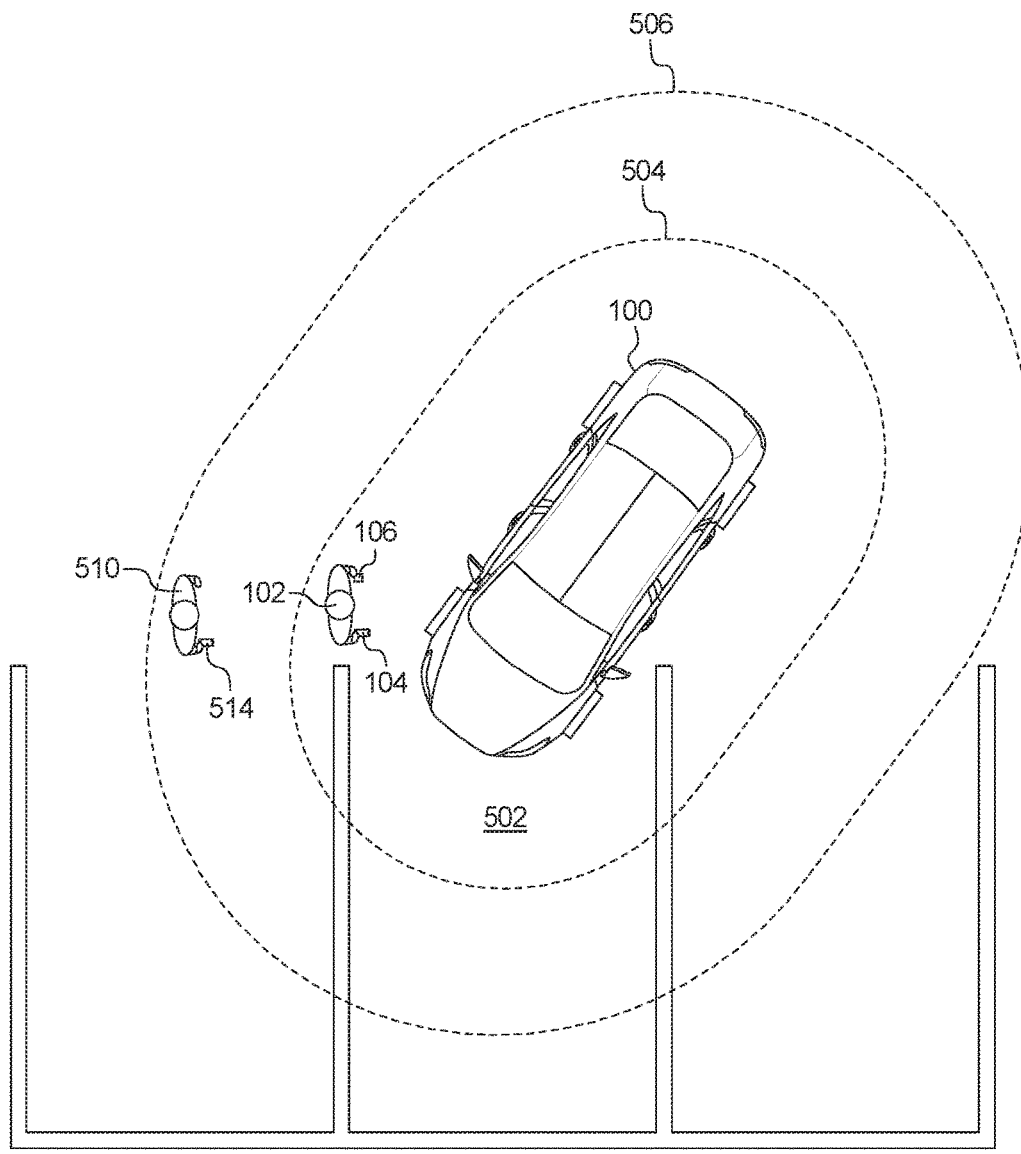
FIG. 7 depicts another example system for managing input signals for remote park-assist of the vehicle of FIG. 1.

FIG. 7 depicts another example system for managing input signals for remote park-assist of the vehicle 100. In the illustrated example, the user 102 utilizes the mobile device 104 when the user 102 is within the tethering range 504 of the vehicle 100 to initiate the performance of remote-park assist motive functions by the autonomy unit 138 to autonomously park the vehicle 100 within the parking spot 502. The RePA controller 140 of the vehicle 100 in the illustrated example facilitates prioritization and processing of input requests by determining whether to process an unlock request based upon a vehicle speed while remote park-assist is being performed.

The vehicle 100 of the illustrated example is permitted to autonomously perform motive functions for remote park-assist when the user 102 is within a tethering range 504 of the vehicle 100 and is prohibited from autonomously performing the motive functions when the user 102 is outside of the tethering range 504. The RePA controller 140 of the illustrated example determines the distance between the user 102 and the exterior surface of the vehicle 100 based upon signals strengths (e.g., RSSIs) of low-frequency communication between the key fob 106 of the user 102 and the communication module 126 of the vehicle 100. Further, BLE communication, Wi-Fi communication, and/or super-high frequency communication is utilized to send remote parking signals and/or other information from the mobile device 104 to the RePA controller 140.

In operation, the RePA controller 140 determines whether remote park-assist is active for the vehicle 100. If the RePA controller 140 determines that the remote park-assist is inactive, the RePA controller 140 waits to designate a mobile device for initiating remote park-assist. For example, when the remote park-assist of the vehicle 100 is inactive, the RePA controller 140 designates a mobile device upon receiving, via the communication module 126, an activation request from the mobile device. That is, the RePA controller 140 is configured to designate the mobile device 104 of the user in response to RePA controller 140 (i) determining that the remote park-assist is inactive and (ii) receiving an activation request from the mobile device 104. In some examples, the mobile device 104 sends the activation request upon the user opening a remote parking app via the touchscreen 308 of the mobile device 104.

In the illustrated example, the autonomy unit 138 of the vehicle 100 activates the remote park-assist in response to the RePA controller 140 designating the mobile device 104 for the remote park-assist. That is, upon designating the mobile device 104, the RePA controller 140 instructs the autonomy unit 138 to activate one or more remote park-assist features. Further, the RePA controller 140 processes remote parking signals received by the communication module 126 from the mobile device 104 when the mobile device 104 is designated for remote park-assist of the vehicle 100.

The autonomy unit 138 is configured to perform motive functions for remote park-assist based upon the remote parking signals that are sent from the mobile device 104, received by the communication module 126, and processed by the RePA controller 140. That is, the RePA controller 140 causes the autonomy unit 138 to perform the remote park-assist upon receiving the remote parking signals from the mobile device 104 via the communication module 126.

In the illustrated example, the autonomy unit 138 performs motive functions for remote park-assist based upon the remote parking signals if the RePA controller 140 (i) identifies a key fob (e.g., the key fob 106) that corresponds with the mobile device 104 sending the remote parking signals and (ii) determines that that key fob is located within the tethering range 504 of the vehicle 100. For example, the RePA controller 140 determines that the key fob 106 corresponds with the mobile device 104 in response to identifying that the distance to and/or location of the key fob 106 with respect to the vehicle 100 corresponds with the distance to and/or location of the mobile device 104 with respect to the vehicle 100. Further, to determine whether the key fob 106 is located within the tethering range 504 of the vehicle 100, the RePA controller 140 compares the tethering range 504 to the distance between the key fob 106 and the vehicle 100 and/or a relative location of the key fob 106 with respect to the vehicle 100.

For example, the communication module 126 is configured to determine the distance between the key fob 106 and the vehicle 100 (with a margin of error) based upon RSSIs, time-of-flight, and/or angle-of-arrival of communication between the key fob 106 and the communication module 126. In some examples, the communication module 126 also is configured to determine the distance between the mobile device 104 and the vehicle 100 (with a margin of error) based upon RSSIs, time-of-flight, and/or angle-of-arrival of communication between the mobile device 104 and the communication module 126. Additionally or alternatively, the communication module 126 is configured to utilize triangulation to determine the location of the mobile device 104 with respect to the vehicle 100 (with a margin of error) based upon RSSIs, time-of-flight, and/or angle-of-arrival of communication between the mobile device 104 and the antenna nodes 134. Further, in some examples, the communication module 126 is configured to utilize triangulation to determine the location of the key fob 106 with respect to the vehicle 100 (with a margin of error) based upon RSSIs, time-of-flight, and/or angle-of-arrival of communication between the key fob 106 and the antenna nodes 134.

The RePA controller 140 determines that the key fob 106 corresponds with the mobile device 104 in response to determining that the key fob 106 and the mobile device 104 are spaced apart from the vehicle 100 by similar distances that are within a threshold margin and/or in response to determining that the key fob 106 and the mobile device 104 are located within a threshold margin of each other. In some examples, if the RePA controller 140 is unable to distinguish between two or more key fobs that are near the mobile device 104 initiating remote park-assist, the RePA controller 140 determines that at least one of those key fobs corresponds with the user 102. Further, in some examples, the RePA controller 140 monitors locations of mobile devices including RePA functionality and/or key fobs over a period of time to determine the trajectory of those mobile devices and/or key fobs. In such examples, the RePA controller 140 is configured to identify the key fob 106 that corresponds with the mobile device 104 initiating the remote park-assist based upon the trajectories of the key fob 106 and the mobile device 104. Further, in some examples, the RePA controller 140 identifies the key fob 106 that of the user 102 that corresponds with the mobile device 104 based upon direct communication between the mobile device 104 and the key fob 106.

In the illustrated example, the RePA controller 140 facilitates prioritization and processing of input requests while remote park-assist is being performed by determining whether to process an unlock request based upon a vehicle speed of the vehicle 100. For example, while the autonomy unit 138 is performing remote park-assist, the RePA controller 140 is configured to receive an unlock request for unlocking one or more of the doors 108 (i) from the key fob 106 of the user 102 via the communication module 126, (ii) from the key fob 514 and/or the mobile device 512 of the user 510 via the communication module 126, (iii) responsive to one of the handle sensors 112 detecting that a user has engaged and/or otherwise contacted the door handle 110 of the corresponding one of the doors 108, (iv) from the keypad 114, etc. In the illustrated example, the mobile device 512 includes phone-as-a-key functionality.

In some examples, the unlock request is a remote request (e.g., sent from the key fob 106, the key fob 514, the mobile device 512). In other examples, the unlock request is a local request (e.g., from the keypad 114, via one of the handle sensors 112). When the unlock request is a remote request, the RePA controller 140 is configured to determine whether the mobile device (e.g., the key fob 106, the key fob 514, the mobile device 512) that sent the remote request is within the threshold range 506 of the vehicle 100. If the mobile device that sent the remote request is beyond the threshold range 506, the RePA controller 140 prevents unlocking of the doors 108 and the autonomy unit 138 proceeds with performing remote park-assist.

The RePA controller 140 of the illustrated example collects the vehicle speed from the vehicle speed sensor 124 of the vehicle 100. If the RePA controller 140 determines that the vehicle speed is less than or equal to the threshold speed, the RePA controller 140 unlocks and/or primes unlocking for one or more of the doors 108 of the vehicle 100 to enable a user (e.g., the user 102, the user 510) to access the cabin of the vehicle 100. For example, upon the RePA controller 140 determining that the vehicle speed is less than or equal to the threshold speed, the RePA controller 140 primes the doors 108 for unlocking and the doors 108 are subsequently unlocked once one of the handle sensors 112 detects that a user has grasped and/or otherwise engaged the door handle 110 of the corresponding one of the doors 108. Further, in some examples, the RePA controller 140 prevents unlocking of the doors 108 while the autonomy unit 138 continues to perform the motive functions for remote park-assist if the RePA controller 140 determines that the vehicle speed is greater than the threshold speed. In other examples, the RePA controller 140 is configured to cause the autonomy unit 138 to stop movement of the vehicle 100 and performance of remote park-assist upon determining that the vehicle speed is greater than the threshold speed. In such examples, the RePA controller 140 permits opening of the doors 108 once the vehicle 100 has stopped moving.

In some examples, the RePA controller 140 prevents unlocking of the doors 108 based upon whether a remote unlock signal was sent via a permissible communication protocol. For example, if the remote request was sent to the communication module 126 of the vehicle 100 via an impermissible communication protocol (e.g., cellular communication), the RePA controller 140 prevents unlocking of the doors 108 and the autonomy unit 138 proceeds with performing remote park-assist. Further, in some examples, the RePA controller 140 is configured to process a remote lock request and/or a remote emergency request regardless of the speed of the vehicle 100.

Figure 8:
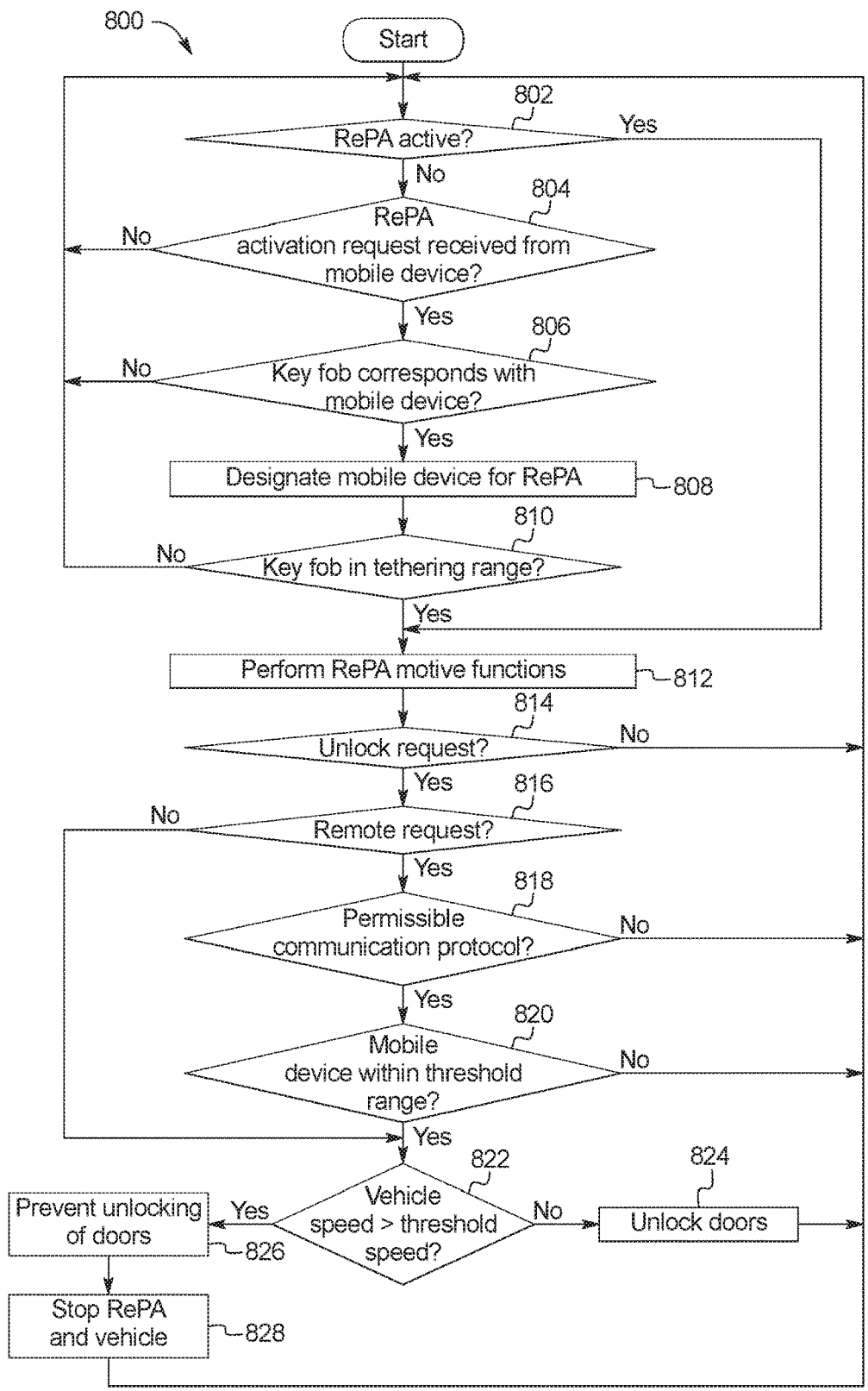
FIG. 8 is another flowchart for managing input signals for remote park-assist in accordance with the teachings herein.

FIG. 8 is a flowchart of another example method 800 to manage input signals for remote park-assist. The flowchart of FIG. 8 is representative of machine readable instructions that are stored in memory (such as the memory 210 of FIG. 2) and include one or more programs which, when executed by a processor (such as the processor 208 of FIG. 2), cause the vehicle 100 to implement the example RePA controller 140 of FIGS. 1 and 2. While the example program is described with reference to the flowchart illustrated in FIG. 8, many other methods of implementing the example RePA controller 140 may alternatively be used. For example, the order of execution of the blocks may be rearranged, changed, eliminated, and/or combined to perform the method 800. Further, because the method 800 is disclosed in connection with the components of FIGS. 1-4 and 7, some functions of those components will not be described in detail below.

Initially, at block 802, the RePA controller 140 determines whether remote park-assist for the vehicle 100 is active. In response to the RePA controller 140 determining that remote park-assist is activated, the method 800 proceeds to block 812. Otherwise, in response to the RePA controller 140 determining that remote park-assist is not activated, the method 800 proceeds to block 804. At block 804, the RePA controller 140 determines whether the communication module 126 of the vehicle 100 has received an activation request from a mobile device (e.g., the mobile device 104 of the user 102) to activate remote park-assist for the vehicle 100. In response to the RePA controller 140 determining that an activation request has not been received, the method 800 returns to block 802. Otherwise, in response to the RePA controller 140 determining that an activation request has been received, the method 800 proceeds to block 806.

At block 806, the RePA controller 140 determines whether there is a key fob (e.g., the key fob 106 of the user 102) that corresponds with the mobile device 104 that sent the activation request for remote park-assist. For example, the RePA controller 140 determines whether the key fob 106 corresponds with the mobile device 104 by identifying whether the key fob 106 and the mobile device 104 are spaced apart from the communication module 126 of the vehicle 100 by similar distances that are within a threshold margin and/or by identifying whether the key fob 106 and the mobile device 104 are located within a threshold margin of each other. In some such examples, the RePA controller 140 determines the distance between the key fob 106 and the vehicle 100 based upon a signal strength of communication between the key fob 106 and the communication module 126, determines the distance between the mobile device 104 and the vehicle 100 based upon a signal strength of communication between the mobile device 104 and the communication module 126, and compares the distance of the key fob 106 to the distance of the mobile device 104. In response to the RePA controller 140 determining that the key fob 106 does not correspond with the mobile device 104, the method 800 returns to block 802. Otherwise, in response to the RePA controller 140 determining that the key fob 106 corresponds with the mobile device 104, the method 800 proceeds to block 808.

At block 808, the RePA controller 140 designates the mobile device 104 that sent the activation request for initiation of remote park-assist features. At block 810, the RePA controller 140 determines whether the key fob 106 that corresponds with the mobile device 104 is within the tethering range 504 of the vehicle 100 for initiating remote park-assist features. For example, the RePA controller 140 determines whether the key fob 106 of the user 102 is within the tethering range 504 based upon signal strengths of communication between the communication module 126 of the vehicle 100 and the key fob 106. In response to the RePA controller 140 determining that the user 102 is outside of the tethering range 504, the method 800 returns to block 802. Otherwise, in response to the RePA controller 140 determining that the user 102 is within the tethering range 504, the autonomy unit 138 activates remote park-assist and the method 800 proceeds to block 812 at which the autonomy unit 138 performs remote park-assist motive functions initiated via the mobile device 104 of the user 102.

At block 814, the RePA controller 140 determines whether the vehicle 100 has received an unlock request to unlock one or more of the 108 of the vehicle 100. For example, an unlock request may be received from the key fob 106 of the user 102, a key fob and/or phone-as-a-key of another user (e.g., the key fob 514 and/or the mobile device 512 of the user 510), the keypad 114, etc. In response to the RePA controller 140 determining that an unlock request has not been received, the method 800 returns to block 802. Otherwise, in response to the RePA controller 140 determining that an unlock request has been received, the method 800 proceeds to block 816.

At block 816, the RePA controller 140 determines whether the received unlock request is a remote request. For example, a remote unlock request includes an unlock request received by the communication module 126 from the key fob 106 of the user 102, a key fob of another user (e.g., the key fob 514 of the user 510), and/or a phone-as-a-key of another user (e.g., the mobile device 512 of the user 510). An unlock request that is not a remote request includes a request received from a device on the vehicle 100, such as the handle sensors 112, the keypad 114, the liftgate sensor 118, etc. In response to the RePA controller 140 determining that the unlock request is not a remote request, the method 800 proceeds to block 822. Otherwise, in response to the RePA controller 140 determining that the unlock request is a remote request, the method 800 proceeds to block 818.

At block 818, the RePA controller 140 determines whether the remote request was sent from a mobile device (e.g., the key fob 106, the mobile device 512, the key fob 514) via a permissible communication protocol. For example, an impermissible communication protocol includes a cellular communication protocol, and permissible communication protocols include a Bluetooth low-energy protocol, a Wi-Fi communication protocol, and super-high frequency communication. In response to the RePA controller 140 determining that the remote request was not sent via a permissible communication protocol, the method 800 returns to block 802. Otherwise, in response to the RePA controller 140 determining that the remote request was sent via a permissible communication protocol, the method 800 proceeds to block 820.

At block 820, the RePA controller 140 determines whether the mobile device (e.g., the key fob 106, the mobile device 512, the key fob 514) that sent the remote unlock request is within the threshold range 506 of the vehicle 100. For example, the RePA controller 140 determines whether the mobile device is within the threshold range 506 based upon signal strengths of communication between the mobile device and the communication module 126 of the vehicle 100. In response to the RePA controller 140 determining that the mobile device is beyond the threshold range 506, the method 800 returns to block 802. Otherwise, in response to the RePA controller 140 determining that the mobile device is within the threshold range 506, the method 800 proceeds to block 822.

At block 822, the RePA controller 140 determines whether the current vehicle speed of the vehicle 100 is greater than a threshold speed. For example, the RePA controller 140 determines the vehicle speed via the vehicle speed sensor 124 while the autonomy unit 138 is performing motive functions for remote park-assist. In response to the RePA controller 140 determining that the vehicle speed is less than or equal to the threshold speed, the method 800 proceeds to block 824 at which the RePA controller 140 unlocks and/or primes for unlocking of one or more of the doors 108 of the vehicle 100. Otherwise, in response to the RePA controller 140 determining that the vehicle speed is greater than the threshold speed, the method 800 proceeds to block 826 at which the RePA controller 140 prevents unlocking of the doors 108 while the autonomy unit 138 continues to perform the motive functions for remote park-assist. Additionally or alternatively, the RePA controller 140, at block 828, causes the autonomy unit 138 to stop movement of the vehicle 100 and performance of remote park-assist. For example, the RePA controller 140 facilitates opening of the doors 108 once movement of the vehicle 100 is stopped.

Figure 9:
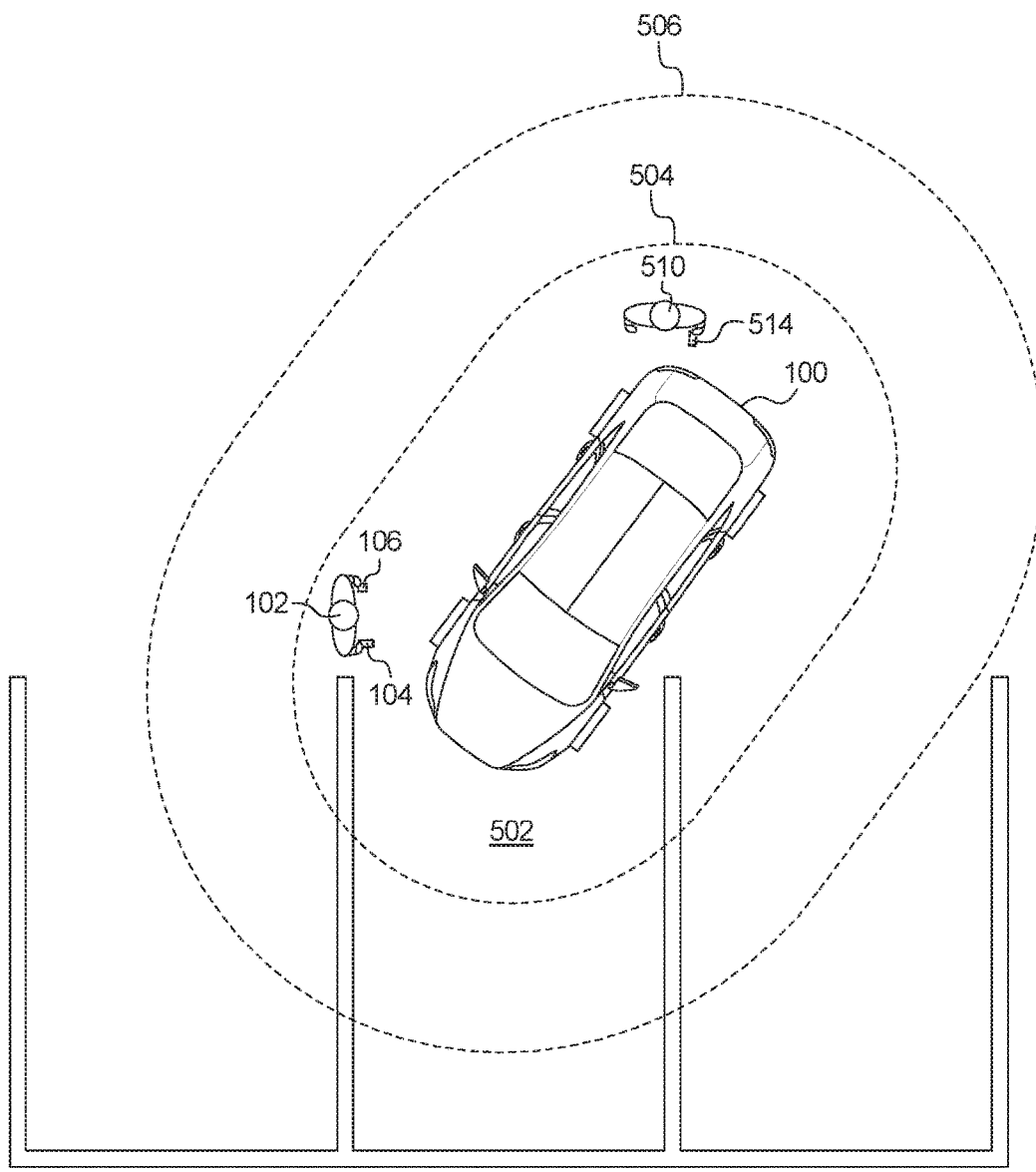
FIG. 9 depicts another example system for managing input signals for remote park-assist of the vehicle of FIG. 1.

FIG. 9 depicts another example system for managing input signals for remote park-assist of the vehicle 100. In the illustrated example, the user 102 utilizes the mobile device 104 when the user 102 is within the tethering range 504 of the vehicle 100 to initiate the performance of remote-park assist motive functions by the autonomy unit 138 to autonomously park the vehicle 100 within the parking spot 502. The RePA controller 140 of the vehicle 100 of the illustrated example facilitate prioritization of input requests by determining whether to process a remote unlock request based upon a number of key fobs that are identified as being within the tethering range 504 of the vehicle 100 while remote park-assist is being performed.

The vehicle 100 of the illustrated example is permitted to autonomously perform motive functions for remote park-assist when the user 102 is within a tethering range 504 of the vehicle 100 and is prohibited from autonomously performing the motive functions when the user 102 is outside of the tethering range 504. The RePA controller 140 of the illustrated example determines the distance between the user 102 and the exterior surface of the vehicle 100 based upon signals strengths (e.g., RSSIs) of low-frequency communication between the key fob 106 of the user 102 and the communication module 126 of the vehicle 100. Further, BLE communication, Wi-Fi communication, and/or super-high frequency communication is utilized to send remote parking signals and/or other information from the mobile device 104 to the RePA controller 140.

In operation, the RePA controller 140 determines whether remote park-assist is active for the vehicle 100. If the RePA controller 140 determines that the remote park-assist is inactive, the RePA controller 140 waits to designate a mobile device for initiating remote park-assist. For example, when the remote park-assist of the vehicle 100 is inactive, the RePA controller 140 designates a mobile device upon receiving, via the communication module 126, an activation request from the mobile device. That is, the RePA controller 140 is configured to designate the mobile device 104 of the user in response to RePA controller 140 (i) determining that the remote park-assist is inactive and (ii) receiving an activation request from the mobile device 104. In some examples, the mobile device 104 sends the activation request upon the user opening a remote parking app via the touchscreen 308 of the mobile device 104.

In the illustrated example, the autonomy unit 138 of the vehicle 100 activates the remote park-assist in response to the RePA controller 140 designating the mobile device 104 for the remote park-assist. That is, upon designating the mobile device 104, the RePA controller 140 instructs the autonomy unit 138 to activate one or more remote park-assist features. Further, the RePA controller 140 processes remote parking signals received by the communication module 126 from the mobile device 104 when the mobile device 104 is designated for remote park-assist of the vehicle 100.

The autonomy unit 138 is configured to perform motive functions for remote park-assist based upon the remote parking signals that are sent from the mobile device 104, received by the communication module 126, and processed by the RePA controller 140. That is, the RePA controller 140 causes the autonomy unit 138 to perform the remote park-assist upon receiving the remote parking signals from the mobile device 104 via the communication module 126.

In the illustrated example, the autonomy unit 138 performs motive functions for remote park-assist based upon the remote parking signals if the RePA controller 140 (i) identifies a key fob (e.g., the key fob 106) that corresponds with the mobile device 104 sending the remote parking signals and (ii) determines that that key fob is located within the tethering range 504 of the vehicle 100. For example, the RePA controller 140 determines that the key fob 106 corresponds with the mobile device 104 in response to identifying that the distance to and/or location of the key fob 106 with respect to the vehicle 100 corresponds with the distance to and/or location of the mobile device 104 with respect to the vehicle 100. Further, to determine whether the key fob 106 is located within the tethering range 504 of the vehicle 100, the RePA controller 140 compares the tethering range 504 to the distance between the key fob 106 and the vehicle 100 and/or a relative location of the key fob 106 with respect to the vehicle 100.

For example, the communication module 126 is configured to determine the distance between the key fob 106 and the vehicle 100 (with a margin of error) based upon RSSIs, time-of-flight, and/or angle-of-arrival of communication between the key fob 106 and the communication module 126. In some examples, the communication module 126 also is configured to determine the distance between the mobile device 104 and the vehicle 100 (with a margin of error) based upon RSSIs, time-of-flight, and/or angle-of-arrival of communication between the mobile device 104 and the communication module 126. Additionally or alternatively, the communication module 126 is configured to utilize triangulation to determine the location of the mobile device 104 with respect to the vehicle 100 (with a margin of error) based upon RSSIs, time-of-flight, and/or angle-of-arrival of communication between the mobile device 104 and the antenna nodes 134. Further, in some examples, the communication module 126 is configured to utilize triangulation to determine the location of the key fob 106 with respect to the vehicle 100 (with a margin of error) based upon RSSIs, time-of-flight, and/or angle-of-arrival of communication between the key fob 106 and the antenna nodes 134.

The RePA controller 140 determines that the key fob 106 corresponds with the mobile device 104 in response to determining that the key fob 106 and the mobile device 104 are spaced apart from the vehicle 100 by similar distances that are within a threshold margin and/or in response to determining that the key fob 106 and the mobile device 104 are located within a threshold margin of each other. In some examples, if the RePA controller 140 is unable to distinguish between two or more key fobs that are near the mobile device 104 initiating remote park-assist, the RePA controller 140 determines that at least one of those key fobs corresponds with the user 102. Further, in some examples, the RePA controller 140 monitors locations of mobile devices including RePA functionality and/or key fobs over a period of time to determine the trajectory of those mobile devices and/or key fobs. In such examples, the RePA controller 140 is configured to identify the key fob 106 that corresponds with the mobile device 104 initiating the remote park-assist based upon the trajectories of the key fob 106 and the mobile device 104. Further, in some examples, the RePA controller 140 identifies the key fob 106 that of the user 102 that corresponds with the mobile device 104 based upon direct communication between the mobile device 104 and the key fob 106.

In the illustrated example, the RePA controller 140 facilitates prioritization and processing of input requests while remote park-assist is being performed by determining whether to process a remote unlock request based upon a number of key fobs that are identified as being within the tethering range 504 of the vehicle 100. For example, while the autonomy unit 138 is performing remote park-assist, the RePA controller 140 is configured to receive, via the communication module 126, an unlock request for unlocking one or more of the doors 108 (i) from the key fob 106 of the user 102, (ii) from the key fob 514 of the user 510, (iii) from a key fob of another user associated with the vehicle 100.

If the RePA controller 140 identifies that the key fob which sent the unlock request is located beyond the tethering range 504, the RePA controller 140 determines that the unlock request was not sent from the key fob 106 of the user 102 initiating remote park-assist via the mobile device 104. That is, the RePA controller 140 determines that the unlock request was sent from another key fob other than the key fob 104. In such instances, it is assumed that another user (e.g., the user 510) intentionally sent the unlock request to unlock one or more of the doors 108 while the user 102 is initiating remote park-assist via the mobile device 104. In turn, the RePA controller 140 causes the autonomy unit 138 to stop movement of the vehicle 100 and performance of remote park-assist if the key fob that sent the unlock request is within the threshold range 506 of the vehicle 100. Further, the RePA controller 140 is configured to permit opening of the doors 108 once the vehicle 100 has stopped moving. In some examples, once the vehicle 100 is stationary, the RePA controller 140 unlocks and/or primes unlocking for one or more of the doors 108 of the vehicle 100 to enable a user (e.g., the user 102, the user 510) to access the cabin of the vehicle 100. For example, the RePA controller 140 primes the doors 108 for unlocking such that the RePA controller 140 unlocks one or more of the doors 108 in response to (i) one of the handle sensors 112 detecting that the door handle 110 of one of the doors 108 has been engaged by a user and (ii) the RePA controller 140 detecting that a key fob and/or phone-as-a-key is near the corresponding one of the doors 108.

Otherwise, upon receiving an unlock request from a key fob within the tethering range 504, the RePA controller 140 identifies the number of key fob(s) within the tethering range 504. For example, the RePA controller 140 identifies the number of key fob(s) near the vehicle 100 based upon the communication signals (e.g., beacons, pings, input signals, etc.) that are received by the communication module 126 of the vehicle 100. That is, the RePA controller 140 identifies the number of key fob(s) near the vehicle 100 by identifying the number of key fob(s) in communication with the communication module 126 of the vehicle 100. Further, the RePA controller 140 identifies the number of key fob(s) that within the tethering range 504 by identifying which of those key fob(s) in communication with the communication module 126 are within the tethering range 504 of the vehicle 100. The RePA controller 140 is configured to determined which of those key fob(s) are within the tethering range 504 based upon signals strengths of the communication signals between the key fob(s) and the communication module 126.

In response to the RePA controller 140 determining that the number of key fob(s) within the tethering range 504 is one, the RePA controller 140 prevents the doors 108 from unlocking and the autonomy unit 138 continues to perform the motive functions for remote park-assist. That is, the RePA controller 140 does not process the unlock request if the number of key fob(s) within the tethering range 504 is one. For example, if the number of key fob(s) within the tethering range 504 is one, the RePA controller 140 determines that the unlock request was sent from the key fob 106 of the user 102 that is initiating performance of the remote park-assist via the mobile device 104. In such instances, it is assumed that the user 102 did not intend to send an unlock request via the key fob 106 while initiating the remote park-assist via the mobile device 104. In turn, the RePA controller 140 ignores the unlock request sent from the key fob 106 to facilitate prioritization of input requests while remote park-assist is being performed.

In response to the RePA controller 140 determining that the number of key fob(s) within the tethering range 504 is two or more, the RePA controller 140 attempts to determine whether the unlock request was sent from the key fob 106 of the user 102 that corresponds with the mobile device 104 initiating the remote park-assist. To determine whether the unlock request was sent from the key fob 106 of the user 102, the RePA controller 140 compares the relative distance(s) and/or location(s) of each of the key fob(s) with respect to the vehicle 100 within the tethering range 504 to the distance between the mobile device 104 and the vehicle 100 and/or a location of the mobile device 104 relative to the vehicle 100.

If the RePA controller 140 identifies that the key fob which sent the unlock request (i) is spaced apart from the vehicle 100 by a different distance than the mobile device 104 and/or (ii) is at a different location than the mobile device initiating remote park-assist, the RePA controller 140 determines that the unlock request was not sent from the key fob 106 of the user 102 initiating remote park-assist via the mobile device 104. That is, the RePA controller 140 determines that the unlock request was sent from another key fob (e.g., the key fob 514). In such instances, it is assumed that another user (e.g., the user 510) intentionally sent the unlock request to unlock one or more of the doors 108 while the user 102 is initiating remote park-assist via the mobile device 104. In turn, the RePA controller 140 causes the autonomy unit 138 to stop movement of the vehicle 100 and performance of remote park-assist. Further, the RePA controller 140 is configured to permit opening of the doors 108 once the vehicle 100 has stopped moving. In some examples, once the vehicle 100 is stationary, the RePA controller 140 unlocks and/or primes unlocking for one or more of the doors 108 of the vehicle 100 to enable a user (e.g., the user 102, the user 510) to access the cabin of the vehicle 100. For example, the RePA controller 140 primes the doors 108 for unlocking such that the RePA controller 140 unlocks one or more of the doors 108 in response to (i) one of the handle sensors 112 detecting that the door handle 110 of one of the doors 108 has been engaged by a user and (ii) the RePA controller 140 detecting that a key fob and/or phone-as-a-key is near the corresponding one of the doors 108.

If the RePA controller 140 identifies that the key fob which sent the unlock request is the only one of the key fob(s) that is (i) located within a threshold distance of the mobile device 104 initiating remote park-assist and/or (ii) spaced apart from the vehicle 100 by the same or similar distances within a threshold margin of the mobile device 104 initiating remote park-assist, the RePA controller 140 determines that the unlock request was sent from the key fob 106 of the user 102 initiating remote park-assist via the mobile device 104. In response to determining that the unlock request was sent from the key fob 106 of the user 102, the RePA controller 140 prevents the doors 108 from unlocking and the autonomy unit 138 continues to perform the motive functions for remote park-assist. That is, it is assumed that the user 102 did not intend to send an unlock request via the key fob 106 while initiating the remote park-assist via the mobile device 104. In such instances, the RePA controller 140 does not process the unlock request sent from the key fob 106 to further facilitate prioritization of input requests while remote park-assist is being performed.

Further, in some examples, the RePA controller 140 potentially may be unable to determine whether the key fob which sent the unlock request corresponds with the mobile device 104 initiating remote park-assist. For example, the RePA controller 140 is unable to determine whether the key fob sending the unlock request corresponds with the mobile device 104 initiating remote park-assist if the RePA controller 140 identifies that the key fob which sent the unlock signal, other key fob(s) which did not send the unlock signal, and the mobile device 104 initiating remote park-assist are located within a threshold distance each other and/or are spaced apart from the vehicle 100 by similar distances within a threshold margin.

In some examples, when the RePA controller 140 is unable to determine whether the key fob that sent the unlock request is the key fob 106 of the user 102 initiating remote park-assist via the mobile device 104, the RePA controller 140 causes the autonomy unit 138 to stop movement of the vehicle 100 and performance of remote park-assist. That is, it is assumed that the unlock request was sent unintentionally while the mobile device 104 is initiating the remote park-assist. Further, the RePA controller 140 is configured to permit opening of the doors 108 once the vehicle 100 has stopped moving. In some examples, once the vehicle 100 is stationary, the RePA controller 140 unlocks and/or primes unlocking for one or more of the doors 108 of the vehicle 100 to enable a user (e.g., the user 102, the user 510) to access the cabin of the vehicle 100.

In other examples, when the RePA controller 140 is unable to determine whether the key fob that sent the unlock request is the key fob 106 of the user 102 initiating remote park-assist via the mobile device 104, the RePA controller 140 prevents the doors 108 from unlocking and the autonomy unit 138 continues to perform the motive functions for remote park-assist. That is, it is assumed that the unlock request was sent unintentionally while the mobile device 104 is initiating the remote park-assist. In such instances, the RePA controller 140 does not process the unlock request sent from the key fob 106 to further facilitate prioritization of input requests while remote park-assist is being performed.

Figure 10:
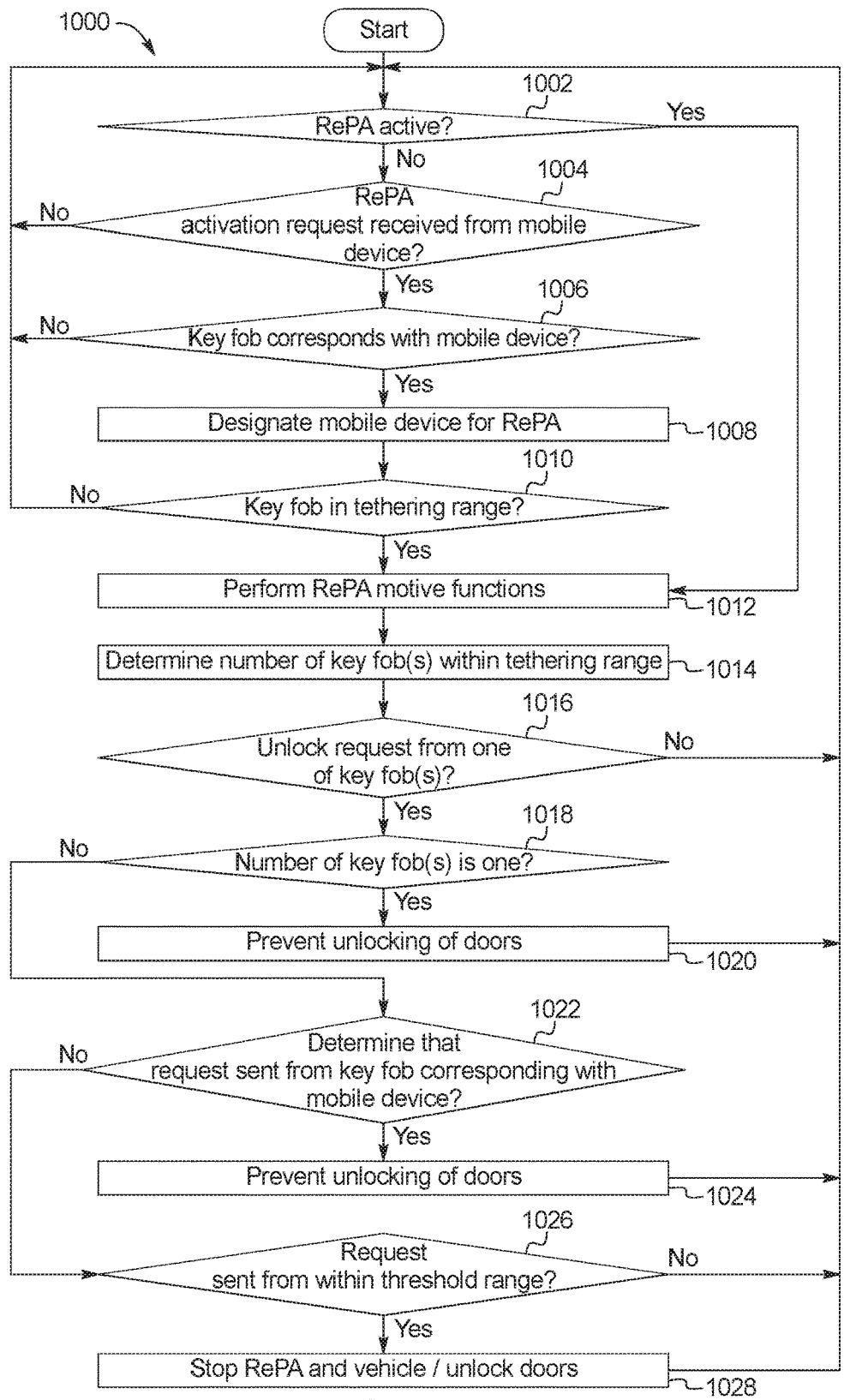
FIG. 10 is another flowchart for managing input signals for remote park-assist in accordance with the teachings herein.

FIG. 10 is a flowchart of another example method 1000 to manage input signals for remote park-assist. The flowchart of FIG. 10 is representative of machine readable instructions that are stored in memory (such as the memory 210 of FIG. 2) and include one or more programs which, when executed by a processor (such as the processor 208 of FIG. 2), cause the vehicle 100 to implement the example RePA controller 140 of FIGS. 1 and 2. While the example program is described with reference to the flowchart illustrated in FIG. 10, many other methods of implementing the example RePA controller 140 may alternatively be used. For example, the order of execution of the blocks may be rearranged, changed, eliminated, and/or combined to perform the method 1000. Further, because the method 1000 is disclosed in connection with the components of FIGS. 1-4 and 9, some functions of those components will not be described in detail below.

Initially, at block 1002, the RePA controller 140 determines whether remote park-assist for the vehicle 100 is active. In response to the RePA controller 140 determining that remote park-assist is activated, the method 1000 proceeds to block 1012. Otherwise, in response to the RePA controller 140 determining that remote park-assist is not activated, the method 1000 proceeds to block 1004. At block 1004, the RePA controller 140 determines whether the communication module 126 of the vehicle 100 has received an activation request from a mobile device (e.g., the mobile device 104 of the user 102) to activate remote park-assist for the vehicle 100. In response to the RePA controller 140 determining that an activation request has not been received, the method 1000 returns to block 1002. Otherwise, in response to the RePA controller 140 determining that an activation request has been received, the method 1000 proceeds to block 1006.

At block 1006, the RePA controller 140 determines whether there is a key fob (e.g., the key fob 106 of the user 102) that corresponds with the mobile device 104 that sent the activation request for remote park-assist. For example, the RePA controller 140 determines whether the key fob 106 corresponds with the mobile device 104 by identifying whether the key fob 106 and the mobile device 104 are located within a threshold distance each other and/or are spaced apart from the communication module 126 of the vehicle 100 by similar distances within a threshold margin. In some such examples, the RePA controller 140 determines the distance and/or relative location between the key fob 106 and the vehicle 100 based upon a signal strength of communication between the key fob 106 and the antenna nodes 134, determines the distance and/or relative location between the mobile device 104 and the vehicle 100 based upon a signal strength of communication between the mobile device 104 and the antenna nodes 134, and compares the distance and/or location of the key fob 106 to the distance and/or location of the mobile device 104. In response to the RePA controller 140 determining that the key fob 106 does not correspond with the mobile device 104, the method 1000 returns to block 1002. Otherwise, in response to the RePA controller 140 determining that the key fob 106 corresponds with the mobile device 104, the method 1000 proceeds to block 1008.

At block 1008, the RePA controller 140 designates the mobile device 104 that sent the activation request for initiation of remote park-assist features. At block 1010, the RePA controller 140 determines whether the key fob 106 that corresponds with the mobile device 104 is within the tethering range 504 of the vehicle 100 for initiating remote park-assist features. For example, the RePA controller 140 determines whether the key fob 106 of the user 102 is within the tethering range 504 based upon signal strengths of communication between the communication module 126 of the vehicle 100 and the key fob 106. In response to the RePA controller 140 determining that the user 102 is outside of the tethering range 504, the method 1000 returns to block 1002. Otherwise, in response to the RePA controller 140 determining that the user 102 is within the tethering range 504, the autonomy unit 138 activates remote park-assist and the method 1000 proceeds to block 1012 at which the autonomy unit 138 performs remote park-assist motive functions initiated via the mobile device 104 of the user 102.

At block 1014, the RePA controller 140 determines a number of key fob(s) that are within the tethering range 504 of the vehicle 100. For example, the RePA controller 140 identifies the number of key fob(s) within the tethering range 504 based upon communication signals received by the communication module 126 of the vehicle 100 (from the key fob(s)). At block 1016, the RePA controller 140 determines whether the communication module 126 has received a door unlock request from one of the key fob(s). In response to the RePA controller 140 determining that an unlock request has not been received from one of the key fob(s), the method 1000 returns to block 1002. Otherwise, in response to the RePA controller 140 determining that an unlock request has been received from one of the key fob(s), the method 1000 proceeds to block 1018.

At block 1018, the RePA controller 140 determines whether the number of key fob(s) within the tethering range 504 is one. In response to the RePA controller 140 determining that the number of key fob(s) within the tethering range 504 is one, the method 1000 proceeds to block 1020 at which the RePA controller 140 prevents unlocking of the doors 108 while the autonomy unit 138 continues to perform the motive functions for remote park-assist. Otherwise, in response to the RePA controller 140 determining that the number of key fob(s) within the tethering range 504 is not one, the method 1000 proceeds to block 1022.

At block 1022, the RePA controller 140 determines whether the unlock request was sent from the key fob 106 that corresponds with the mobile device 104 initiating the remote park-assist. For example, the RePA controller 140 determines whether a key fob sending an unlock request corresponds with the mobile device 104 by identifying that (i) the key fob sending the unlock request and the mobile device 104 are located within a threshold distance of each other and/or are spaced apart from the communication module 126 of the vehicle 100 by similar distances that are within a threshold margin and (ii) other key fob(s) within the tethering zone are at different locations and/or are spaced apart from the communication module 126 by different distance(s). In response to the RePA controller 140 determining that the key fob sending the unlock request was corresponds with the mobile device 104, the method 1000 proceeds to block 1024 at which the RePA controller 140 prevents unlocking of the doors 108 while the autonomy unit 138 continues to perform the motive functions for remote park-assist. Otherwise, in response to the RePA controller 140 not determining that the key fob sending the unlock request was corresponds with the mobile device 104 (e.g., the RePA controller 140 determined that the unlock request was sent from another key fob, the RePA controller 140 was unable to identify the key fob sending the unlock request), the method 1000 proceeds to block 1026.

At block 1026, the RePA controller 140 determines whether the unlock request sent from one of the key fob(s) is within the threshold range 506. For example, the RePA controller 140 determines whether the key fob sending the unlock request is within the threshold range 506 based upon signal strengths of communication between that key fob and the communication module 126 of the vehicle 100. In response to the RePA controller 140 determining that the key fob sending the unlock request is beyond the threshold range 506, the method 1000 returns to block 1002. Otherwise, in response to the RePA controller 140 determining that the mobile device is within the threshold range 506, the method 1000 proceeds to block 1028 at which the RePA controller 140 causes the autonomy unit 138 to stop movement of the vehicle 100 and facilitates opening of the doors 108 once movement of the vehicle 100 is stopped (e.g., by unlocking the doors 108, by priming the doors 108 for unlocking).

An example disclosed vehicle includes an autonomy unit, a communication module, and a controller. The controller is to perform, via the autonomy unit, remote parking upon receiving, via the communication module, a remote parking signal from a mobile device. The controller also is to receive an unlock request during the remote parking from a first key fob, determine a number of key fobs within a tethering range, and prevent processing of the unlock request when the number of key fobs is one.

In some examples, the autonomy unit is configured to continue to perform the remote parking when the controller prevents processing of the unlock request.

In some examples, the communication module is configured to communicate with key fobs via a first communication protocol and communicate with the mobile device via a second communication protocol. In some such examples, the first communication protocol is low frequency communication and the second communication protocol is at least one of is at least one of a Bluetooth® low-energy protocol, a Wi-Fi protocol, and ultra-high frequency communication.

In some examples, the controller enables the autonomy unit to perform the remote parking responsive to identifying that a user key fob corresponds with the mobile device and determining the user key fob is located within the tethering range. In some such examples, the controller determines that the user key fob corresponds with the mobile device in response to determining that the user key fob and the mobile device are spaced apart from the vehicle by distances that are within a threshold margin of each other. In some such examples, the controller determines that the user key fob corresponds with the mobile device in response to determining that the user key fob and the mobile device are located within the threshold margin of each other.

In some examples, when the number of key fobs within the tethering range is two or more, the controller attempts to determine whether the first key fob that sent the unlock request is a user key fob that corresponds with the mobile device of a user. In some such examples, in response to determining that the first key fob is the user key fob, the controller prevents processing of the unlock request. In some such examples, in response to determining that the first key fob is not the user key fob, the controller stops the remote parking. In some examples, in response to the controller being unable to determine whether the first key fob is the user key fob, the controller stops the remote parking.

Some examples further include a door, a door handle, and a door handle sensor. In some such examples, when the remote parking is stopped, the controller is configured to unlock the door in response to the door handle sensor detecting engagement with the door handle.

An example disclosed method includes receiving, via a communication module of a vehicle, a remote parking signal from a mobile device and performing, via an autonomy unit, remote parking upon receipt of the remote parking signal. The example disclosed method also includes receiving an unlock request during the remote parking from a first key fob and determining, via a processor, a number of key fobs within a tethering range. The example disclosed method also includes preventing processing of the unlock request when the number of key fobs is one.

Some examples further include continuing to perform the remote parking when preventing processing of the unlock request. Some examples further include enabling the autonomy unit to perform the remote parking responsive to identifying that the mobile device corresponds with a user key fob in response to determining, via received signal strength indicators, that the user key fob and the mobile device are located within a threshold margin of each other and determining the user key fob is located within the tethering range.

Some examples further include, when the number of key fobs within the tethering range is two or more, attempting to determine whether the first key fob that sent the unlock request is a user key fob that corresponds with the mobile device. Some such examples further include preventing processing of the unlock request in response to determining that the first key fob is the user key fob. Some such examples further include stopping the remote parking in response to at least one of determining that the first key fob is not the user key fob and being unable to determine whether the first key fob is the user key fob. Some such examples further include, when the remote parking is stopped, unlocking a door in response to a door handle sensor detecting engagement with a door handle.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an autonomy unit;
   a communication module; and
   a controller to:
      perform, via the autonomy unit, remote parking upon receiving, via the communication module, a remote parking signal from a mobile device;
      receive an unlock request during the remote parking from a first key fob;
      determine a number of key fobs within a tethering range; and
      prevent processing of the unlock request when the number of key fobs is one.

2. The vehicle of claim 1, wherein the autonomy unit is configured to continue to perform the remote parking when the controller prevents processing of the unlock request.

3. The vehicle of claim 1, wherein the communication module is configured to communicate with key fobs via a first communication protocol and communicate with the mobile device via a second communication protocol.

4. The vehicle of claim 3, wherein the first communication protocol is low frequency communication and the second communication protocol is at least one of is at least one of a Bluetooth® low-energy protocol, a Wi-Fi protocol, and ultra-high frequency communication.

5. The vehicle of claim 1, wherein the controller enables the autonomy unit to perform the remote parking responsive to:
   identifying that a user key fob corresponds with the mobile device; and
   determining the user key fob is located within the tethering range.

6. The vehicle of claim 5, wherein the controller determines that the user key fob corresponds with the mobile device in response to determining that the user key fob and the mobile device are spaced apart from the vehicle by distances that are within a threshold margin of each other.

7. The vehicle of claim 6, wherein the controller determines that the user key fob corresponds with the mobile device in response to determining that the user key fob and the mobile device are located within the threshold margin of each other.

8. The vehicle of claim 1, wherein, when the number of key fobs within the tethering range is two or more, the controller attempts to determine whether the first key fob that sent the unlock request is a user key fob that corresponds with the mobile device of a user.

9. The vehicle of claim 8, wherein, in response to determining that the first key fob is the user key fob, the controller prevents processing of the unlock request.

10. The vehicle of claim 8, wherein, in response to determining that the first key fob is not the user key fob, the controller stops the remote parking.

11. The vehicle of claim 8, wherein, in response to the controller being unable to determine whether the first key fob is the user key fob, the controller stops the remote parking.

12. The vehicle of claim 1, further including a door, a door handle, and a door handle sensor.

13. The vehicle of claim 12, wherein, when the remote parking is stopped, the controller is configured to unlock the door in response to the door handle sensor detecting engagement with the door handle.

14. A method comprising:
receiving, via a communication module of a vehicle, a remote parking signal from a mobile device;
performing, via an autonomy unit, remote parking upon receipt of the remote parking signal;
determining, via a processor, a number of key fobs within a tethering range; and
preventing processing of an unlock request received from a first key fob during the remote parking of the vehicle when the number of key fobs within the tethering range is one.

15. The method of claim 14, further including continuing to perform the remote parking when preventing processing of the unlock request.

16. The method of claim 14, further including enabling the autonomy unit to perform the remote parking responsive to:
identifying that the mobile device corresponds with a user key fob in response to determining, via received signal strength indicators, that the user key fob and the mobile device are located within a threshold margin of each other; and
determining the user key fob is located within the tethering range.

17. The method of claim 14, further including, when the number of key fobs within the tethering range is two or more, attempting to determine whether the first key fob that sent the unlock request is a user key fob that corresponds with the mobile device.

18. The method of claim 17, further including preventing processing of the unlock request in response to determining that the first key fob is the user key fob.

19. The method of claim 18, further including stopping the remote parking in response to at least one of:
determining that the first key fob is not the user key fob; and
being unable to determine whether the first key fob is the user key fob.

20. The method of claim 19, further including, when the remote parking is stopped, unlocking a door in response to a door handle sensor detecting engagement with a door handle.

* * * * *